(12) United States Patent
Huang et al.

(10) Patent No.: US 10,974,441 B2
(45) Date of Patent: Apr. 13, 2021

(54) METHODS AND APPARATUSES FOR FREEFORM ADDITIVE MANUFACTURING OF ENGINEERING POLYMERS

(71) Applicant: University of Florida Research Foundation, Incorporated, Gainesville, FL (US)

(72) Inventors: Yong Huang, Gainesville, FL (US); Ashley M. Compaan, Gainesville, FL (US); Kaidong Song, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 16/703,686

(22) Filed: Dec. 4, 2019

(65) Prior Publication Data
US 2020/0307068 A1    Oct. 1, 2020

Related U.S. Application Data

(60) Provisional application No. 62/778,479, filed on Dec. 12, 2018.

(51) Int. Cl.
| | |
|---|---|
| *B29C 64/10* | (2017.01) |
| *B33Y 10/00* | (2015.01) |
| *B29C 64/106* | (2017.01) |
| *B29K 75/00* | (2006.01) |
| *B29K 55/02* | (2006.01) |

(52) U.S. Cl.
CPC ........... *B29C 64/106* (2017.08); *B33Y 10/00* (2014.12); *B29K 2055/02* (2013.01); *B29K 2075/00* (2013.01)

(58) Field of Classification Search
None
See application file for complete search history.

(56) References Cited

FOREIGN PATENT DOCUMENTS

WO    WO-2015017421 A2 *    2/2015    ............. B33Y 10/00

OTHER PUBLICATIONS

3D Printing PDMS Elastomer in a Hydrophilic Support Bath via Freeform Reversible Embedding. ACS Biomaterials Science and Engineering. vol. 2 pp. 1781-1786 (Year: 2016).*
(Continued)

*Primary Examiner* — Cachet I Proctor
(74) *Attorney, Agent, or Firm* — Alston & Bird LLP

(57) ABSTRACT

A polymer three-dimensional (3D) printing methodology is disclosed for freeform fabrication of polymeric structures under ambient conditions without the use of printed support structures. The build material can be dissolved in a suitable solvent for 3D printing. The polymer solution can be printed in (e.g., continuously printed using a moving dispensing nozzle) a yield-stress support bath to form an intermediate article. The intermediate article may be liquid or only partially coagulated after being printed into the yield-stress support bath. The yield-stress support bath may be at least partially disposed within a container, and the container may be immersed in a post-treatment coagulation solution to remove some or all of the solvent, causing the build material to fully solidify to form a finished article from the intermediate article.

20 Claims, 7 Drawing Sheets

(56) References Cited

OTHER PUBLICATIONS

Bryan et al. Self-assembled micro-organogels for 3D printing silicone strucutres. Science Advances Research Article. vol. 3 pp. 1-8. 2017 (Year: 2017).*

Hinton, Thomas J. et al. *3D Printing PDMS Elastomer In A Hydrophilic Support Bath Via Freeform Reversible Embedding*, ACS Biomaterials Science & Engineering, vol. 2, No. 10, (2016), pp. 1781-1786. DOI: 10.1021/acsbiomaterials.6b00170.

Jin, Yifei et al. *Functional Nanoclay Suspension For Printing-Then-Solidification Of Liquid Materials*, ACS Applied Materials & Interfaces, vol. 9, No. 23, (2017), pp. S1-S29. 20057-20066.

Jin, Yifei et al. *Granular Gel Support-Enabled Extrusion Of Three-Dimensional Alginate And Cellular Structures*, Biofabrication, vol. 8, No. 2: 025016, (2016), pp. 1-21.

Jin, Yifei et al. *Printability Study Of Hydrogel Solution Extrusion In Nanoclay Yield-Stress Bath During Printing-Then-Gelation Biofabrication*, Materials Science and Engineering: C, vol. 80, pp. 313-325, (2017), DOI: 10.1016/j.msee.2017.05.144.

O'Bryan, Christopher S. et al. *Self-Assembled Micro-Organogels for 3D Printing Silicone Structures*, Science Advances, vol. 3, No. 5:e1602800, May 2017, pp. 1-8.

Hinton, Thomas J. et al. *Three-Dimensional Printing Of Complex Biological Structures By Freeform Reversible Embedding Of Suspended Hydrogels*. Science Advances, vol. 1, No. 9:e1500758, Oct. 23, 2015, (24 pages).

O'Bryan, Christopher S. et al. (2017). *Three-Dimensional Printing With Sacrificial Materials For Soft Matter Manufacturing*. MRS Bulletin, vol. 42, No. 8, pp. 571-577. DOI: 10.1557/mrs.2017.167.

Bhattacharjee, Tapomoy et al. *Writing In The Granular Gel Medium*. Science Advances, vol. 1, No. 8:e1500655, Sep. 25, 2015, pp. 1-6.

* cited by examiner

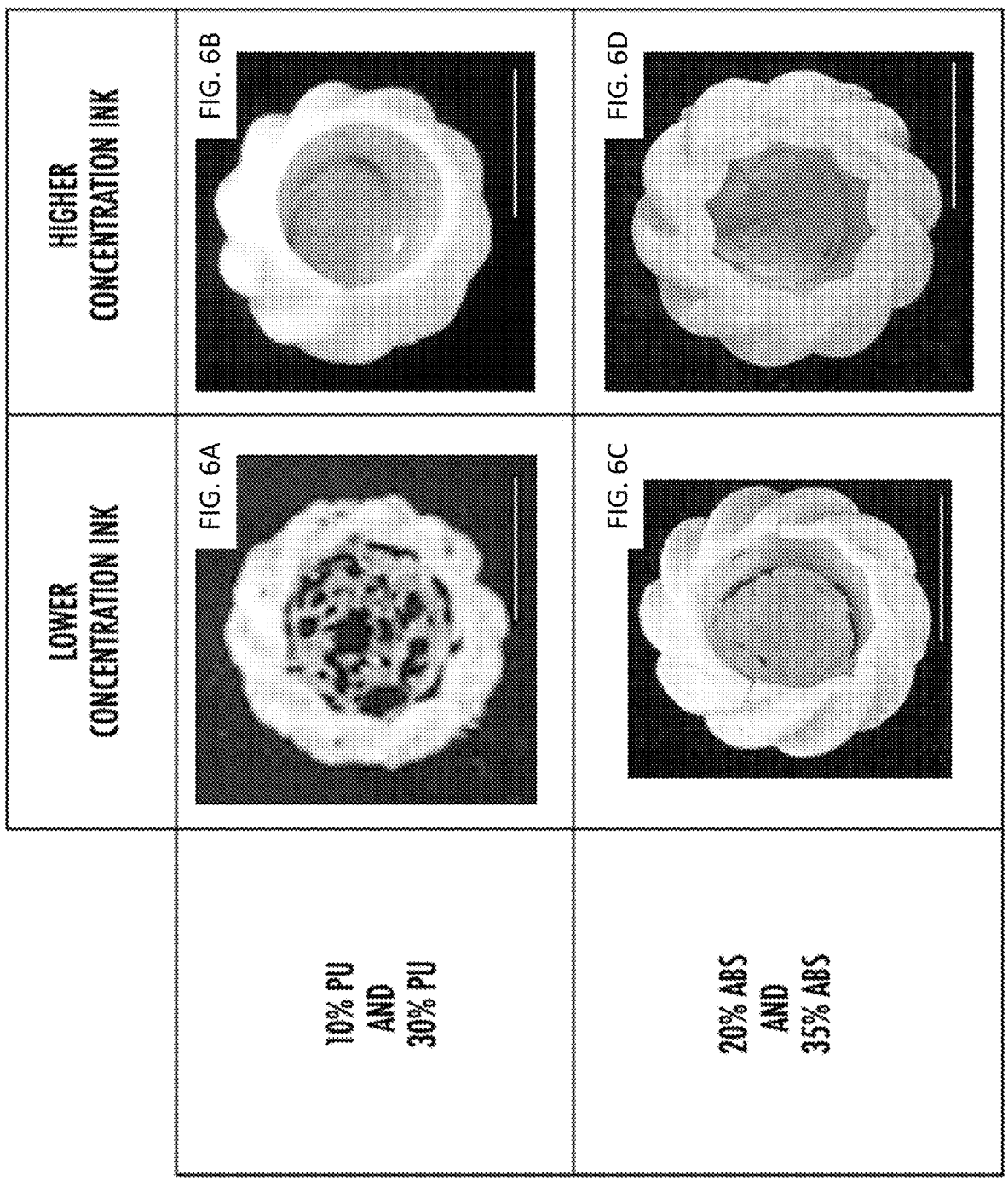

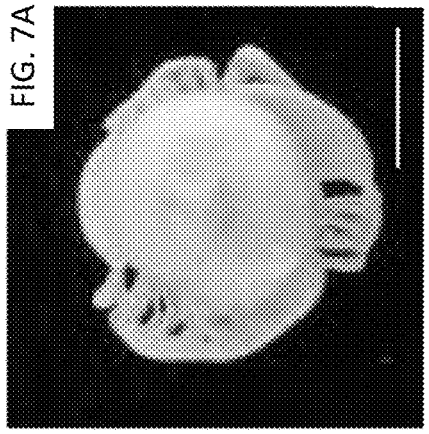
FIG. 7A
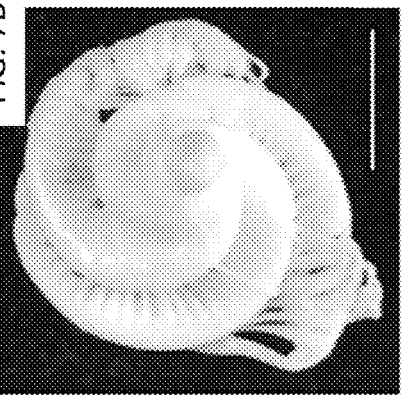
FIG. 7B
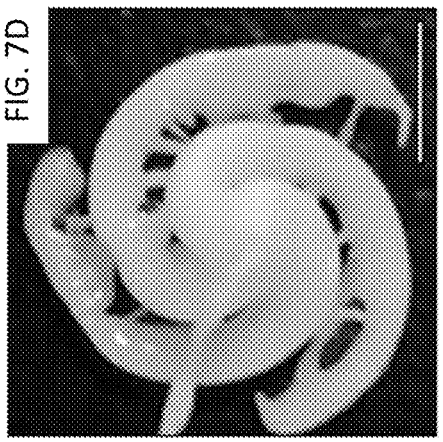
FIG. 7D
FIG. 7C

METHODS AND APPARATUSES FOR FREEFORM ADDITIVE MANUFACTURING OF ENGINEERING POLYMERS

CROSS-REFERENCE TO RELATED APPLICATIONS

This application claims priority to and the benefit of U.S. Provisional Patent Application Ser. No. 62/778,479, filed Dec. 12, 2018, entitled "Solvent Enabled Freeform Additive Manufacturing of Engineering Polymers at Room Temperature," the entire contents of which is hereby incorporated herein by reference in its entirety for all purposes.

TECHNICAL FIELD

Embodiments described herein relate generally to additive manufacturing, and more particularly to freeform additive manufacturing of polymeric materials.

BACKGROUND

Additive manufacturing, also referred to as three-dimensional (3D) printing, encompasses a range of technologies used to fabricate parts by adding material to build up the part rather than by subtracting unwanted material away from a bulk starting workpiece. Generally, 3D printing forms parts by depositing and/or solidifying build material layer-by-layer in computer-controlled patterns generated from a digital part model; each layer forms a thin slice of the complete part and the layers are integrated to form a tangible part based on the digital model. In fused deposition modeling (FDM), a widely implemented type of 3D printing, a thermoplastic build material in the form of a filament is melted and extruded from a hot tip to generate 3D parts layer-by-layer in a controlled spatial pattern; as in other 3D printing processes, the part is first generated as a computer model, then transformed into commands for a 3D printer. FDM can be used for fabricating prototypes and products from rigid thermoplastic polymer materials, such as poly(lactic acid) (PLA) and acrylonitrile-butadiene-styrene (ABS).

As FDM printing technology continues to mature, there is a demand for more versatile approaches which are compatible with a wider range of polymeric build materials to fabricate more complex prototypes and end-use parts with a broad range of properties and features.

SUMMARY

A polymer three-dimensional (3D) printing method and associated apparatus are disclosed for fabrication of 3D printed structures and articles. In some embodiments, the fabrication may be freeform fabrication. In some embodiments, the 3D printed structures and articles may be formed from a build material, such as a polymeric material in a polymer/solvent solution. In some embodiments, 3D printed structures and articles may be fabricated under ambient conditions and/or without the use of printed support structures which would need to be removed after 3D printing in order to achieve the finished structure or article. In some embodiments, a build material can be dissolved in a suitable solvent or solvent solution (e.g., solvent/non-solvent mixture) for 3D printing. In some embodiments, the build material can comprise one or more polymers or a polymer solution. In some embodiments, the build material can be disposed within a support bath, such as a yield-stress support bath. In some embodiments, the yield-stress support bath can comprise one or more yield-stress support materials having a particular composition and particular mechanical properties such that the yield-stress support bath is suitable to support the build material once disposed within the yield-stress support bath. In some embodiments, to form an intermediate article in the yield-stress support bath comprising a yield-stress support material, the build material may be printed into and supported by the yield-stress support material. The intermediate article may be a liquid or only partially coagulated or solidified after being printed into the yield-stress support material. In some embodiments, the yield-stress support bath may be at least partially contained within a container. In some embodiments, once the build material is disposed within the yield-stress support bath, the container at least partially containing the yield-stress support bath may then be immersed in a post-treatment coagulation solution to further or fully solidify the printed build material. In some embodiments, heat, a chemical reactant, electromagnetic radiation, and/or the like may be disposed within or transmitted into the container to further or fully solidify the printed build material. In some embodiments, by solidifying the printed build material within the yield-stress support bath, a finished article may be formed from the intermediate article.

In some embodiments, a method for three-dimensional printing of a finished article can include, optionally, dissolving a polymeric material in a solvent to form a build material. In some embodiments, the build material can comprise any suitable polymeric material such as a thermoplastic. In some embodiments, a polymeric material can be dissolved or dispersed in any suitable solvent. In some embodiments, such a solvent can comprise dimethyl sulfoxide (DMSO), and/or the like. In some embodiments, to form the build material, the polymeric material can be dissolved in the solvent partially or fully, at about room temperature (about 20° C. to about 25° C.), or at an elevated temperature, while being stirred, shaken, agitated, bombarded with electromagnetic radiation and/or ultrasonic sound waves, or the like. In some embodiments, one or more solvents can be chosen that are capable of breaking down the build material without causing molecular degradation or a reduction in the degree of polymerization (DP). Conventional additive manufacturing and 3D printing techniques for polymeric materials typically requires melting the polymeric material at least partially if not fully to facilitate the communication and build-up of the article using the polymeric material. These conventional additive manufacturing and 3D printing techniques for polymeric materials can require high heat, which can make the process costly, dangerous, time-consuming, and limiting in terms of the reusability of printing materials. By contrast, the room temperature process according to some embodiments described herein requires no heating of the printing materials, no thermal deterioration of the polymers, and can eliminate the process step from conventional additive manufacturing and 3D printing methods of heating and/or melting the polymeric material.

In some embodiments, the method can further include extruding, injecting, or otherwise disposing the build material, e.g., a dissolved polymeric material, into the yield-stress support bath to form an intermediate article. In some embodiments, the intermediate article only partially solidified. Additionally or alternatively, in some embodiments, the build material, e.g., a dissolved polymeric material, can be injected, spun, inserted, communicated, dropped, conveyed, or otherwise dispensed or disposed within the yield-stress support bath such that the yield-stress support bath can facilitate at least partial formation of the article. Regardless of the particular manner in which the build material, e.g., the dissolved polymeric material, is disposed, dispersed, injected, extruded, spun, sputtered, dropped, or dispensed into the yield-stress support bath, or otherwise comes to be within the yield-stress support bath, the yield-stress support bath can provide sufficient support for the at least partial formation of the intermediate article. Said otherwise, in some embodiments, the build material can be disposed in particular quantities at particular locations within the yield-stress support bath and/or at a particular rate while a disposing nozzle is moved along a particular path through the yield-stress support bath. In some embodiments, the particular volume of the yield-stress support bath in which the build material is disposed can relate to the eventual volume of the intermediate article.

According to some embodiments, the yield-stress support material in the yield-stress support bath can provide sufficient support for at least partial solidification or coagulation of the build material solution, facilitating the formation of the intermediate article directly within and supported by the yield-stress support material such that the intermediate article is formed free of printed support structures. Such support structures are often used in conventional additive manufacturing and 3D printing techniques and usually must be trimmed away after formation of the intermediate or finished article. By forming the intermediate article without printed supports in the yield-stress support bath, the methods described herein can reduce or eliminate the labor-intensive, costly, and time-consuming manufacturing stage of trimming away the printed support structures once the finished article is formed or otherwise printed.

In some embodiments, the build material can comprise a polymeric material, such as at least one from among thermoplastic polymer, thermosetting polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, copolymers thereof, and their combinations, mixtures containing two or more of the following polyethylene, ultra-high molecular weight polyethylene, and polypropylene, as well as, mixtures of the foregoing with copolymers such as ethylene-butene copolymers and ethylene-hexene copolymers, thermosetting plastics, such as polyimide (PI), poly amide (PA), and poly amide imide (PAI), polypropylene (PP), polyethylene (PE), ethylene vinylacetate (EVA), poly(ethylene terephthalate) (PET), poly(vinyl acetate) (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), combinations thereof, and/or the like.

In some embodiments, the solvent can comprise at least one from among dimethyl sulfoxide (DMSO), dimethylformamide (DMF), acetonitrile, ethanol, combinations thereof, and/or the like.

In some embodiments, the yield-stress support bath can comprise a polymer/solvent mixture, such as a Carbopol®-based solvent-rich support bath. In some embodiments, the yield-stress support bath can comprise any suitable rheological additive as described herein dissolved or dispersed in a suitable solvent, such as but not limited to DMSO, DMF, acetonitrile, ethanol and the like. By way of example only, a yield-stress support material can include Carbopol® (a type of rheological additive), DMSO, and water. More specifically, a support bath according to at least one embodiment can include 1.5% Carbopol® by weight or by volume, mixed into an approximately 9:1 v/v ratio of DMSO:H$_2$O. In some embodiments, other rheological additives such as a synthetic layered silicate, e.g., Laponite XLG, and the like can be added to prepare the solvent-based support bath material. Rheological additives can include shear thinning additives, shear thickening additives, thixotropic rheology modifiers, and other such additives. In some embodiments, the additive can be chosen carefully such that the yield-stress support bath provides sufficient yield-stress support to the printed polymer/solvent solution upon injection and so that the viscosity and chemical properties of the yield-stress support bath disallows or partially disallows mixing and diffusion or solvation of the printing/build material solution or components thereof. In some embodiments, the yield-stress support material can be prepared or caused to be prepared by mixing together a suitable rheological additive and a solvent, mixture of solvents, and/or solvent/non-solvent mixture, and the solution can be allowed to "set" for a sufficient period of time, e.g., 12 hours. In some embodiments, the period during which the solution sets may be helpful and/or necessary for the resulting yield-stress support material in the yield-stress support bath to have suitable rheological and mechanical properties to support freeform printing of the intermediate article in the yield-stress support bath. In other embodiments, the yield-stress support material may not require any or substantially any, or may require only a very short period of time to set, before the yield-stress support material exhibits suitable rheological and/or mechanical properties such that the yield-stress support material supports freeform printing of the intermediate article in the yield-stress support bath. Many other compositions and concentrations of support bath material and additives thereto were tested, are contemplated, and are within the scope of the current disclosure. Some, but not all, of the suitable compositions, concentrations, methods, apparatuses, parameters, rheological or mechanical properties, and printing materials are described herein below.

The method can further include immersing the intermediate article in a post-treatment coagulation solution to fully solidify the intermediate part into the finished article. The post-treatment coagulation solution can comprise any suitable material, for instance one or more of water, deionized water, ethanol, or the like.

It should be appreciated that all combinations of the foregoing concepts and additional concepts discussed in greater detail below (provided such concepts are not mutually inconsistent) are contemplated as being part of the inventive subject matter disclosed herein. In particular, the combinations of claimed subject matter appearing at the end of this disclosure are contemplated as being part of the inventive subject matter disclosed herein. It should be appreciated that terminology explicitly employed herein that also may appear in any disclosure incorporated by reference should be accorded a meaning consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6A provides a photographic image of an article formed from a 10% polyurethane build material by freeform additive manufacturing using a yield-stress support bath, according to some embodiments.

FIG. 6B provides a photographic image of an article formed from a 30% polyurethane build material by freeform additive manufacturing using a yield-stress support bath, according to some embodiments.

FIG. 6C provides a photographic image of an article formed from a 20% acrylonitrile butadiene styrene build material by freeform additive manufacturing using a yield-stress support bath, according to some embodiments.

FIG. 6D provides a photographic image of an article formed from a 35% acrylonitrile butadiene styrene build material by freeform additive manufacturing using a yield-stress support bath, according to some embodiments.

FIG. 7A provides a photographic image of an article formed from a 30% acrylonitrile butadiene styrene build material by freeform additive manufacturing using a yield-stress support bath comprising 1.5% Carbopol 940 in 85% dimethyl sulfoxide, according to some embodiments.

FIG. 7B provides a photographic image of an article formed from a 30% polyurethane build material by freeform additive manufacturing using a yield-stress support bath comprising 1.5% Carbopol 940 in 85% dimethyl sulfoxide, according to some embodiments.

FIG. 7C provides a photographic image of an article formed from a 30% acrylonitrile butadiene styrene build material by freeform additive manufacturing using a yield-stress support bath comprising 1.5% Carbopol 940 in 95% dimethyl sulfoxide, according to some embodiments.

FIG. 7D provides a photographic image of an article formed from a 30% polyurethane build material by freeform additive manufacturing using a yield-stress support bath comprising 1.5% Carbopol 940 in 95% dimethyl sulfoxide, according to some embodiments.

DETAILED DESCRIPTION

Figure 1:
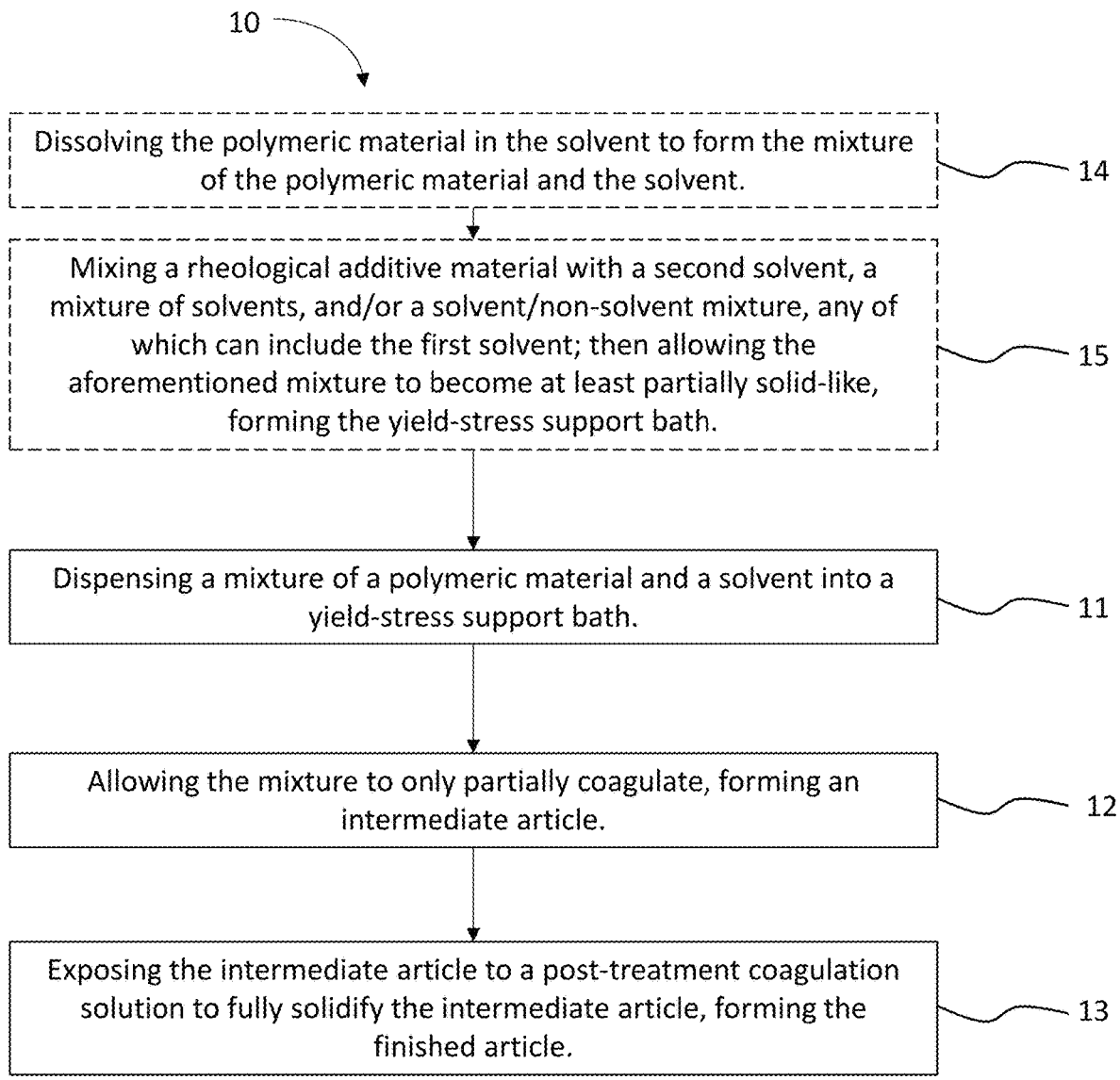
FIG. 1 illustrates a process flow diagram of a method of 3D printing, according to an embodiment.

Additive manufacturing, also referred to as three-dimensional (3D) printing, encompasses a range of technologies used to fabricate parts by building material up rather than by subtracting unwanted material away from a bulk starting workpiece. Conventionally, printed parts are formed using 3D printing by depositing and/or solidifying a build material layer-by-layer in computer-controlled patterns generated from a digital part model; each layer forms a thin slice of the complete part and the layers are integrated to form a tangible part based at least in part on the digital model. Another conventional 3D printing technique is fused deposition modeling (FDM), a widely implemented type of 3D printing, in which a thermoplastic build material in the form of a filament is melted and extruded from a hot tip to generate 3D parts layer-by-layer in a controlled spatial pattern; as in other 3D printing processes, the part is first generated as a computer model, then transformed into commands for a printer. FDM can be used for fabricating prototypes and products from rigid thermoplastic polymer materials, such as poly(lactic acid) (PLA) and acrylonitrile-butadiene-styrene (ABS).

Additive manufacturing is a powerful tool for production and prototyping using a wide range of materials. Conventional 3D printing methods, for instance conventional FDM methods, may be suitable for a limited range of polymeric materials and geometries, however there are many articles, materials, and production scenarios for which using such conventional 3D printing approaches compromises article printing precision, article mechanical properties, and/or the cost/time associated with production.

Typically, conventional 3D printing methods such as FDM methods involve melting the 3D printing/build material to enable iterative, layered deposition, which may result in thermal damage to the polymer (molecular degradation) as well as undesirable thermal residual stress. For instance, certain polymeric materials such as non-thermoplastic polymers may degrade upon heating instead of melting. Thus, these materials cannot or should not be melt processed. Other materials are difficult to handle in the filament form necessary for conventional FDM since they are prone to damage from the feed mechanism, stretching, distortion, and irregular flow; all of which can result in inconsistent printing performance and unpredictable part properties. Sometimes it can be difficult to FDM print high-temperature engineering polymers. For instance, even if high temperature plasticity is achievable for most polymers, the thermal residual stress within FDM parts may also be a concern. Such thermal residual stress within FDM parts may be a result of thermal gradients between individual deposited layers and between the printed part and its surroundings. Oftentimes, such thermal residual stress can lead to deformation of a FDM part, can lead to deficient mechanical properties, can reduce the mechanical, optical, thermal, radiative, and/or chemical stability of the FDM part, and/or can lead to aesthetic and/or operability issues. Such deficiencies and issues may present themselves at some time after FDM printing of the FDM part, or may present themselves, alone or in combination with other issues, sometime after FDM printing, such as after some amount of use of the part or after some exposure of the FDM part to an environmental or a man-made stimulus.

Additionally, undesirable surface and interface characteristics at the interface between two neighboring filaments or layers may reduce the mechanical strength and other mechanical properties of the finished article. As such, FDM often results in a finished part that has reduced internal mechanical strength, which can lead to a reduction in the overall mechanical properties of the FDM printed part or portions thereof.

Furthermore, current FDM technology generally requires the use of a temporary support material which is printed alongside the part to ensure that overhanging regions and other details remain intact, especially for soft polymer build materials but also often for other build materials. This requirement for support structures to be concurrently printed with the finished article increases the complexity of the printing machinery since it must handle multiple materials, the complexity of the code to appropriately deposit the support material, the fabrication time since switching heads and printing support structures are both time consuming, and the post-processing time since the support material must be removed after printing is complete. Thus, a more robust methodology for 3D printing engineering polymers including soft and/or non-thermoplastic materials is of great interest. It is desired that this process be implementable in ambient conditions to avoid thermal residual stress on the printed article, minimize interfaces between filaments or layers, and reduce the use of printed support structures to maximize fabrication efficiency.

Thus, the inventors have conceived of and diligently reduced to practice multiple embodiments of a method and an associated apparatus for three-dimensional (3D) printing that enables freeform fabrication of printed structures and articles. According to some embodiments, such freeform fabrication can be carried out under ambient conditions. According to these and/or other embodiments, such freeform fabrication can be carried out without the use of support structures (e.g., printed support structures, solid support structures, support structures that are inherent to the printed article or the printing platform, support structures that should or must be removed after printing and before the printed article is ready for use, and/or the like). According to some embodiments, a build material (e.g., a polymeric material) can be dissolved in a solvent, a solvent mixture, or a mixture of solvent(s) with non-solvents (e.g., a rheological modifier and/or the like) for extrusion printing. The build material/solvent solution (which is also referred to interchangeably herein as the "ink," the "printing mixture," the "printing medium," the "polymer mixture," and the "polymer solution,") can be printed in and supported by a yield-stress support bath to form an entire 3D part in the yield-stress support material. The printed part may be still liquid or only partially coagulated. After printing, the yield-stress support bath container can be immersed in a post-treatment coagulation solution to solidify the printed polymer material, and the solid printed part can then be removed from the yield-stress support material and post-treatment bath.

Referring now to FIG. 1, a method 10 for three-dimensional printing of a finished article can include dispensing a mixture of a polymeric material and a solvent into a yield-stress support bath, at 11, and allowing the intermediate article to only partially coagulate or solidify, forming an intermediate article, at 12. In some embodiments, the dissolved polymeric material can be injected, spun, inserted, communicated, dropped, conveyed, or otherwise dispensed within the yield-stress support bath such that the yield-stress support bath can facilitate at least partial formation of the article. Regardless of the particular manner in which the dissolved polymeric material is dispensed within the yield-stress support bath, the yield-stress support bath can provide sufficient support for the at least partial formation of the intermediate article. According to some embodiments, the yield-stress support bath can provide sufficient support for the at least partial formation of the intermediate article such that the intermediate article is formed free of printed support structures. Such support structures are used extensively across the array of conventional additive manufacturing and 3D printing techniques and are often required to be trimmed away after formation of the intermediate or finished article. By forming the intermediate article without printed supports in the yield-stress support bath, the methods described herein can eliminate the labor-intensive, costly, and time-consuming process step of trimming away the printed support structures once the article is fully formed.

In some embodiments, the polymeric material can include at least one from among thermoplastic polymer, thermosetting polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, copolymers thereof, and their combinations, mixtures containing two or more of the following polyethylene, ultra-high molecular weight polyethylene, and polypropylene, as well as, mixtures of the foregoing with copolymers such as ethylene-butene copolymers and ethylene-hexene copolymers, thermosetting plastics, such as polyimide (PI), poly amide (PA), and poly amide imide (PAI), polypropylene (PP), polyethylene (PE), ethylene vinylacetate (EVA), poly (ethylene terephthalate) (PET), poly-vinyl acetate (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), and any combinations thereof.

In some embodiments, the solvent can include at least one from among dimethyl sulfoxide (DMSO), dimethylformamide (DMF), acetonitrile, ethanol, combinations thereof, and the like.

The method 10 can further include exposing the intermediate article to a post-treatment coagulation solution to fully solidify the intermediate article, forming the finished article, at 13. The post-treatment coagulation solution can comprise any suitable material with regard to the 3D printing material (e.g., the build material), the solvent chosen, and/or the yield-stress support material, for instance one or more of water, deionized water, ethanol, and the like. Many other compositions and concentrations of post-treatment coagulation solution were tested, are contemplated, and are within the scope of the current disclosure.

The method 10 can optionally include dissolving the polymeric material in the solvent to form the mixture of the polymeric material and the solvent, at 14. The polymeric material can be dissolved or dispersed in any suitable solvent, such as but not limited to dimethyl sulfoxide (DMSO), and the like. The polymeric material can be dissolved or dispersed in the solvent partially or fully, at about room temperature (about 20° C. to about 25° C.). Alternatively, the polymeric material can be dissolved or dispersed at a temperature less than or greater than about room temperature. In some embodiments, dissolution of the polymer material for 3D printing can be accomplished with the help of other processes or energies, such as by stirring, shaking or agitating the polymeric material/solvent mixture, by bombarding the mixture with ultrasonic waves, electromagnetic energy, or other energies, and/or the like. The solvent or solvents can be chosen such that the solvent can break down the build material without causing molecular degradation or a reduction in the degree of polymerization (DP). Conventional additive manufacturing and 3D printing techniques for polymeric materials typically requires melting the polymeric material at least partially if not fully to facilitate the communication and build-up of the article using the polymeric material. These conventional additive manufacturing and 3D printing techniques for polymeric materials can require high heat to melt the build material, which can make the conventional processes costly, relatively more dangerous, time-consuming, and/or limiting in terms of the reusability of printing materials. By contrast, the method 10 described herein, according to some embodiments, is carried out at or around room temperature and therefore does not require heat to be applied during the process, does not induce thermal deterioration of the polymers, and eliminates the process step of heating and/or melting the polymeric material.

The method 10 can optionally include mixing a rheological additive material with a second solvent, mixture of solvents, and/or solvent/non-solvent mixture and allowing the rheological additive material mixture to become at least partially solid-like, forming the yield-stress support bath, at 15. In some embodiments, the yield-stress support bath can be a rheological additive-solvent mixture, such as a Carbopol®-based solvent-rich support bath. In some embodiments, the yield-stress support bath can comprise any suitable rheological additive as described herein dissolved or dispersed in a suitable solvent, such as but not limited to DMSO, DMF, acetonitrile, ethanol and the like, or any combination thereof. By way of example only, a support bath material can include at least Carbopol®, DMSO, and water. More specifically, a support bath according to at least one embodiment can include 1.5% Carbopol® by weight or by volume, mixed into an approximately 9:1 v/v ratio of $DMSO:H_2O$. In some embodiments, additives such as a synthetic layered silicate, e.g., Laponite XLG, and the like can be added to the yield-stress support material. Rheological additives can include shear thinning additives, shear thickening additives, thixotropic rheology modifiers, and other such additives. In some embodiments, the additive can be chosen carefully such that the yield-stress support bath provides sufficient yield-stress support to the printed polymer/solvent solution upon injection and so that the viscosity and chemical properties of the yield-stress support bath disallows mixing and extensive diffusion or solvation of the printing/build material solution or components thereof. In some embodiments, the yield-stress support material can be prepared or caused to be prepared by mixing together the suitable rheological additive and a solvent, mixture of solvents, or solvent/non-solvent mixture and the solution can be allowed to "set" for a period of time, e.g., 12 hours, before printing is carried out. Many other compositions and concentrations of support bath material and additives thereto were tested, are contemplated, and are within the scope of the current disclosure.

This method 10 can be carried out for the fabrication of arbitrary parts in arbitrary orientations. In other words, the complexity, costliness, and time necessary to carry out fabrication is at least partially decoupled from the shape, dimensions, and complexity of the article being fabricated. The implications for practical applications are surprising and significant. Conversely, 3D printing a polymeric article, e.g., an article having high complexity, according to conventional processes requires a not insignificant amount of thought, time, and/or computing power be dedicated to the printing orientation of the part to maximize printing precision and minimize printing time, requires careful placement of printed support structures such that the printed article is sufficiently stabilized and such that the printed support structures are minimized, and requires time, labor, and therefore cost to trim away the support structures from the finished article, a process which sometimes damages the printed article such that the printed article must be scrapped. The 3D printing methods, e.g., the method 10, described herein can eliminate the need for a particular orientation, are not rendered more time-consuming or costly with increasing article complexity, and do not require support structures to be printed concurrent to the printing of the article, meaning less 3D printing/build material is wasted and the printed support structure trimming step is eliminated completely. The advantages in terms of production cost and time for 3D printed articles, among other advantages associated with these methods, are clear. Select finished articles formed from various materials according to various embodiments of the method, e.g., the method 10, are illustrated in FIGS. 2A-2G according to article designed illustrated in FIGS. 2L-2N.

For example, ABS parts were printed according to the method 10 for comparison with traditional FDM results, while soft poly(urethane) and rigid poly(acrylonitrile) and acrylic build materials were printed according to the method 10 to illustrate the versatility of the process and highlight the effects of fabrication parameters on the printed parts.

Solid blocks, branching tubular shells, intricate solid parts, and hollow parts with complex surface textures, among other structures and form factors, were printed to demonstrate the print fidelity, achievable infill density and morphology, resolution, and printing precision of the proposed methodology. Solid blocks illustrate the surface quality, shape fidelity, and ability to form bulk parts, while tubular structures demonstrate the excellent connections between layers and ability to print fine features. Intricate solid and hollow parts illustrate the ability to combine porous, solid, tortuous, and thin features in a single printed part to meet the demands of scientists, engineers, and designers for various applications.

As shown in the images of FIGS. 2A-2G, the freeform printing methods disclosed herein are operable for printing various article structures using materials such as acrylonitrile butadiene styrene (ABS; see, e.g., FIGS. 2A-2E), polyurethane (PU, see, e.g., FIGS. 2H and 2I), polyacrylonitrile (PAN, also known as polyvinyl cyanide, see, e.g., FIGS. 2J and 2K), acrylics (see, e.g., FIGS. 2F and 2G), and/or other suitable materials, to form finished articles having wide ranges of dimensions, complexity, and printing precision. By way of example only, the spiral cone illustrated in FIGS. 2E, 2I, 2K, and 2F, printed according to the design of FIG. 2M, represent a precise article printed according to an embodiment of the method described herein, the precise article having a singular support at the top of the spiral cone from which the arms of the spiral cone extend rotationally. For the sake of comparison, a similar spiral cone article (not shown) was 3D printed according to a conventional 3D printing method; the conventionally printed spiral cone article exhibited inherent mechanical failure points along each arm of the spiral cone, the inherent mechanical failure points associated with interfacial weakness between printed layers (leading to cohesive failure, for instance). Such a conventionally printed spiral cone article would require multiple (perhaps many) support structures to be printed (e.g., before or concurrent with the printing of the conventionally printed spiral cone article) to enable additive printing of the arms of the spiral cone, the trimming of which would render the spiral cone article less precise in terms of arm dimensions, surface and edge effects, and/or the precision of a pointed distal portion of each arm. In other words, for the printing of many articles, including but not limited to more complex articles or articles requiring precise dimensions and shapes, conventional 3D printing is typically disadvantageous, especially when compared to embodiments of the method described herein. As such, the methods, e.g., the method 10, disclosed herein typically result in superior article properties and result in the realization of certain efficiencies during printing associated with only printing the article and not printing support structures. Furthermore, there are efficiencies of post-processing associated with not having to remove (trim) support structures from the 3D printed article. Also, the yield-stress support material (or portions thereof) may be reusable for subsequent printing of another article in the yield-stress support bath, which may mean that, unlike conventional 3D printing platforms which must be cleaned and any excess printing medium or build material removed before subsequent printing within or on the same 3D printing platform, the disclosed apparatuses, yield-stress support materials, and yield-stress support baths formed therewith may be usable for printing multiple articles without, for instance, having to remove the yield-stress support material from the yield-stress support bath.

Figure 3:
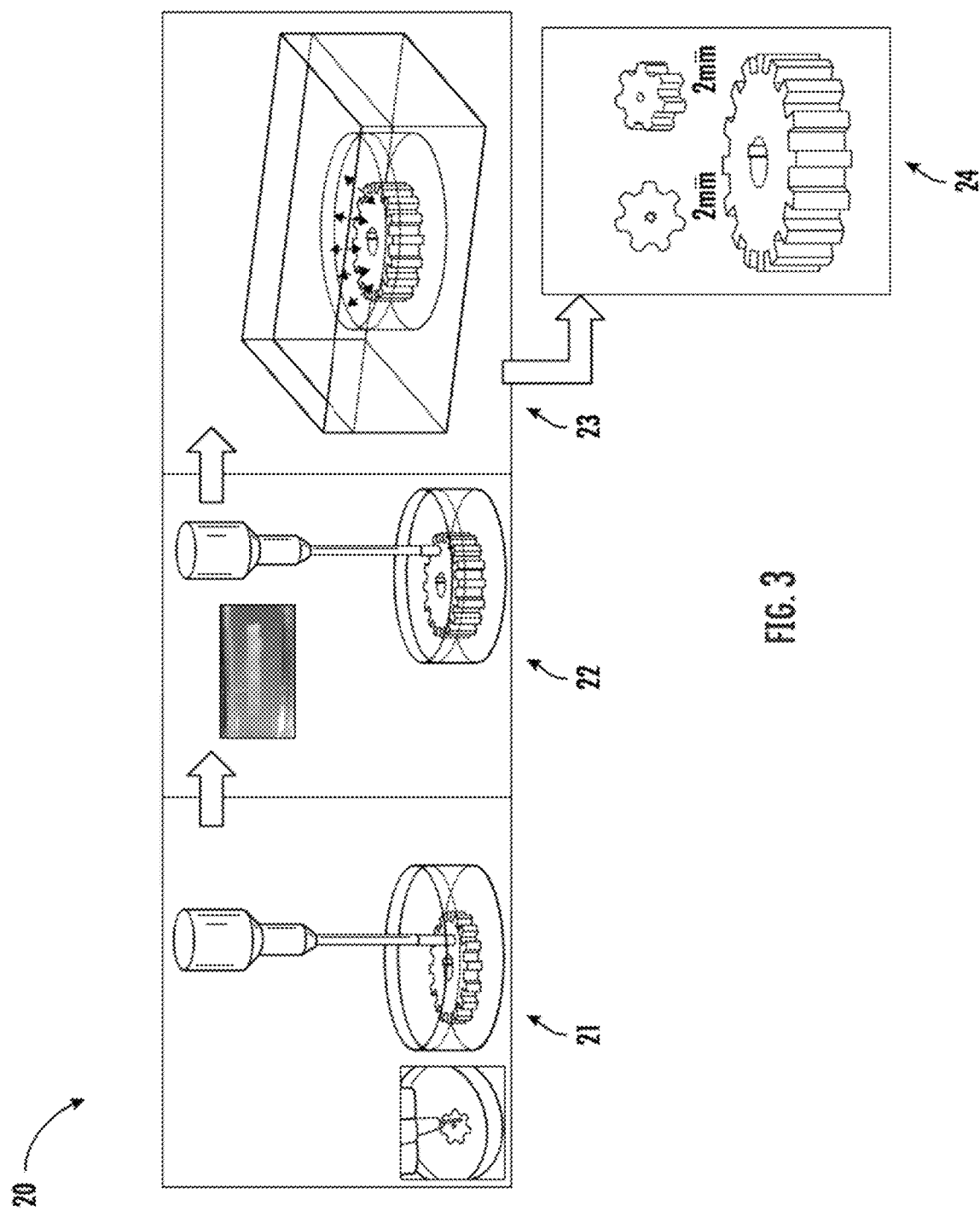
FIG. 3 illustrates a process flow diagram of a method for 3D printing articles into a yield-stress support bath, according to an embodiment.

Referring now to FIG. 3, a polymer 3D printing method 20 is illustrated that is configured to enable freeform fabrication of polymeric structures under ambient conditions without the use of printed support structures. In some embodiments, the method 20 can include injecting a thermoplastic polymer and solvent solution into a solvent-rich yield-stress support bath, at 21. The injecting 21 can be carried out by any suitable mechanical apparatus such as a syringe, plunger, nozzle, pipe, conduit, pathway, or the like. In some embodiments, the build material, can be previously dissolved or caused to be dissolved in a suitable solvent to make a viscous polymer solution, which can be loaded into an ink reservoir for extrusion printing as part of the injecting 21. The polymer solution, during the injecting 21, can be directly printed in (injected into) and supported by the yield-stress support bath. The yield-stress support bath can comprise a yield-stress support material configured to maintain particular rheological properties (e.g., a solid-like state) unless disturbed by a nozzle, such as a printing nozzle, in which the yield-stress support material becomes at least partially fluid or has a sufficient mechanical properties (e.g., reduced viscosity) such that the polymer solution can be disposed within the disturbed portion of the yield-stress support material adjacent to the printing nozzle.

In some embodiments, the printing nozzle or other mechanical apparatus configured to inject or extrude the build material into the solvent-rich yield-stress support bath can be fixed or configured to be moved during the injecting 21. For instance, in some embodiments, a computing device, e.g., a computer including at least one processor and at least one memory device, can be configured to move or cause movement of the printing nozzle between different locations or portions of the solvent-rich yield-stress support bath. In some embodiments, the computing device can move or cause movement of the printing nozzle along a computer-controlled path or paths while injecting 21 to form filaments, layers, and eventually an entire 3D part in the solvent-rich yield stress support bath material.

In some embodiments, the printing nozzle can have a longitudinal contour, form factor, dimensions, and/or surface properties such that the use of the printing nozzle to inject, extrude, or otherwise deposit the build material into the solvent-rich yield-stress support bath minimizes the influence of undesirable nozzle movement-induced support bath liquefaction, which may encourage the up overflow of deposited materials. Said another way, the printing nozzle can be dimensioned and configured to move through the solvent-rich yield-stress support bath and deposit build material within the yield-stress support bath without disrupting the intra-bath structure and consistency. For example, movement of the printing nozzle through the yield-stress support bath could, if the printing nozzle is improperly dimensioned and configured, cause a hardening of the yield-stress support bath such that injection of build material causes the build material simply to overflow the yield-stress support bath and/or travel laterally to the desired destination volume within the yield-stress support bath. In some embodiments, the printing nozzle can have a sufficiently large length to width ratio such that movement of the printing nozzle through the yield-stress support bath minimally disrupts the yield-stress properties of the yield-stress support bath, thereby not disrupting or only minimally disrupting the injection path of the build material upon injecting into the yield-stress support bath.

The yield-stress support material can be or include a yield-stress material based at least in part on a mixture of a solvent and non-solvent, a single solvent, or a mixture of solvents, which can be selected and formulated to control the speed at which the printed build material coagulates. The printed part may be still liquid or only partially coagulated for some time after injecting 21, or may remain liquid or only partially coagulated for an extended period of time after injecting 21, as shown at 22. Partial coagulation may effectively prevent excessive diffusion of printed polymers into the surrounding support bath material. While the function of solvent in the yield-stress support bath may be to prevent complete coagulation of printed polymers, the function of non-solvent is to initiate the coagulation process. Thus, the type of solvent and non-solvent chosen, as well as the ratio of solvent to non-solvent in the yield-stress support bath can be finely tuned, in light of the material choices and ratio of polymeric build material and solvent in the printing solution, to achieve the desired degree of coagulation for the intermediate article. The method 20 can further include immersing the yield-stress support bath container in a post-treatment coagulation solution to solidify the printed polymer material, at 23. After sufficient time and/or once the finished article is formed in terms of the degree of coagulation/solidification of the article, the finished article can then be removed from the yield-stress support material and post-treatment bath, at 24. In some embodiments, no further steps or processes or treatments are required after removal of the finished article from the yield-stress support bath and the post-treatment bath in order to achieve a finished article having the desired dimensions and mechanical properties of the finished printed part.

For the proposed printing methodology to be feasible, a structure being printed should remain liquid or partially liquid to avoid filament/layer interfaces and nozzle clogging. The printing of a liquid structure is accomplished by using a yield-stress support bath in which build material ink is extrusion printed. In general, support bath materials suitable for 3D printing are thixotropic yield-stress materials which are also compatible with the solidification/gelation of the printed material. Yield-stress materials behave as solids at rest but as liquids when a sufficient shear stress is applied (the yield stress); after the stress is removed, they promptly revert to solid-like behavior. Thus, a rigid printing nozzle can easily be inserted into a bulk yield-stress support bath. In some embodiments, as the printing nozzle travels through the yield-stress support material in the yield-stress support bath, it may locally liquefy the yield-stress support material to allow ink deposition. In some embodiments, local liquefaction of the yield-stress support material may be helpful or necessary to allow for deposition of the ink (e.g., polymer build material in solvent and/or other materials) into the yield-stress support material, and such liquefaction of the yield-stress support material may be caused or contributed to by the movement of the printing nozzle to or around or adjacent to the desired printing location within the yield-stress support bath. However, such liquefaction or a particular extent of liquefaction of the yield-stress support material, in some embodiments, may be unnecessary and/or undesirable, for reasons including those described herein related to overflow or upwelling of ink and/or the yield-stress support material. In some embodiments, once the ink (e.g., solvent solution comprising fluid build material) is injected, dispensed into, extruded, and/or otherwise disposed within the yield-stress support material, the ink (e.g., comprising the fluid build material) is then trapped in the particular desired location within the yield-stress support bath as the yield-stress support material reverts to solid-like behavior when the printing nozzle travels away from the particular desired location in which the build material is trapped. In some embodiments, the build material is then trapped in a 3D configuration defined by a travel path defined for the printing nozzle and may retain its shape even though it is still fluid or partially fluid. An entire 3D fluid intermediate part can be formed in this way. Then, a stimulus can be applied which causes or contributes to solidification or partial solidification of the fluid build material so that it can be separated from the yield-stress support bath as an intact part.

The proposed printing approach may be utilized for any polymer which can be solubilized and then coagulated to form a continuous solid part. As noted above, the concept extends to any solvent-based support bath formulation in which the rheology can be modified to generate a yield-stress material. By way of example only, some embodiments are illustrated and described for which a dimethyl sulfoxide (DMSO)/water (solvent/non-solvent) combination is selected since it is suitable for a range of useful engineering polymers and convenient to handle, however many other solvents and non-solvents and combinations thereof were tested, are contemplated, and are within the scope of the current disclosure.

Provided below are some, but not all, examples of methods for freeform 3D printing of various polymeric articles, similar to or according to the methods 10 and 20 described hereinabove.

For instance, according to one example ink formulations were prepared by dissolving a solid polymer in a solvent, e.g., DMSO (Bioreagent grade, Fisher, Fair Lawn, N.J., USA). In some embodiments, in order to 3D print polyurethane (PU) parts, 3.0 g of soft thermoplastic polyurethane (Elastollan soft 35A, BASF, Wyandotte, Mich., USA) were mixed with 7.0 mL of DMSO to make nominally 30.0% w/v ink; 10.0% w/v and 20.0% w/v inks were prepared by combining 1.0 g or 2.0 g PU with 9.0 mL or 8.0 mL DMSO, respectively. In some embodiments, to prepare a PAN ink, PAN (poly(acrylonitrile), 150 kDa, Pfaltz and Bauer, Waterbury, Conn., USA) was dissolved in DMSO at a concentration of 7.6% w/w or 15.2% w/w. In some embodiments, to prepare an ABS ink, ABS filament was dissolved in DMSO to make 30.0% w/w ABS ink. According to one or more embodiments, an acrylic support material filament (P400-SR, Stratasys, Eden Prairie, Minn., USA) was dissolved in DMSO to make a 33.3% w/w ink.

According to one or more embodiments, to prepare 50 mL of 1.5% Carbopol support bath material in 9:1 DMSO:H2O, 45 mL DMSO was mixed with 5 mL deionized water before adding 0.75 g Carbopol 940 (Lubrizol, Cleveland, Ohio, USA) and mixing thoroughly. According to some embodiments, the resulting mixtures was allowed to equilibrate for at least 12 hours before use. According to some embodiments, after confirming at least adequate performance, the formulations were used without pH adjustment. In some embodiments, 1.0%, 2.0%, and 2.5% Carbopol formulations, among other possible formulations, were prepared in a similar fashion. In some embodiments, the solvent ratio was also varied from 0-15% v/v water.

According to some embodiments, Laponite XLG (BYK Additives Inc., Gonzales, Tex.)) was dispersed in DMSO and water was then added to reach a final composition of 3:1 $DMSO:H_2O$ (v:v) with 3% Laponite XLG (w/v). In some embodiments, the yield-stress support material was then mixed (e.g., vortexed) thoroughly and allowed to stand for some time (e.g., 12 hours or more) before printing.

In some embodiments, printing was carried out using a Hyrel Engine SR (Hyrel3D, Norcross, Ga.) with a CSD-5 dispensing head (without a UV array) controlled with a Repetrel software interface. Ink, prepared according to any of the embodiments of compositions, apparatuses, processes, and/or methods described herein, was loaded in a disposable 5 mL syringe fitted with a stainless steel 23 gauge tip (Norsdon EFD, Vilters, Switzerland). According to some embodiments, STL models were sliced using an embedded Slic3r utility in the Repetrel software to generate G-code. According to some embodiments, parameters for additive manufacturing using the apparatuses described herein can comprise a layer thickness of about 0.15 mm and a printing speed of about 600 mm/min.

According to some embodiments, after printing, the entire support bath was immersed in water for at least 3 hours to replace the solvent in the yield-stress support bath (e.g., DMSO) with non-solvent (e.g., $H_2O$) and therefore coagulate the printed polymer (e.g., ABS, PU, or the like) within the yield-stress support bath. According to some embodiments, once some, most, or all of the solvent is replaced, the solid printed parts were removed from the yield-stress support material and rinsed (e.g., with water, deionized (DI) water, tap water, or the like) to remove any excess yield-stress support material from the surface of the printed article. In some embodiments, deionized water containing 1% w/v sodium chloride (Sigma Life Sciences, St. Louis, Mo., USA) or 5% sodium chloride was used instead of pure DI or tap water.

According to some embodiments, rheological properties were measured using a rheometer (MCR-702 TwinDrive, Anton-Paar, Graz, Austria) with a 25 mm sandblasted (Ra=4:75 μm) parallel-plate measuring geometry, 1 mm gap. In some embodiments, to determine the yield stress quantitatively, steady rate sweeps were conducted by varying the shear rate from 100/s to 0.01/s, and the stresses were measured at different shear rates; a pre-shear step at 100/s for 30 sec followed by a 1 min rest to recover structure was used to eliminate loading effects.

Printing Results

Figure 2:
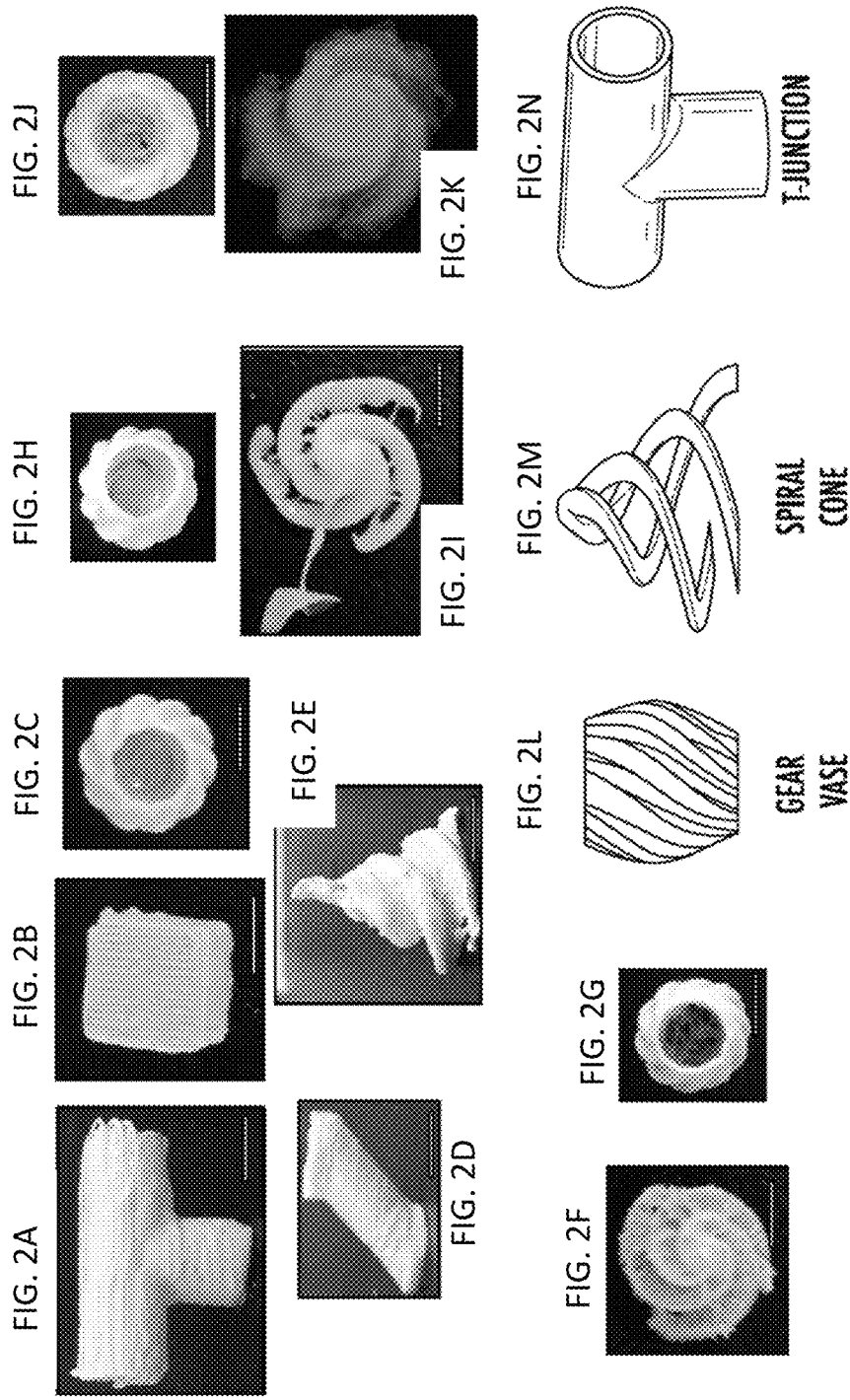
FIG. 2A provides a photographic image of an article formed from acrylonitrile butadiene styrene, according to some embodiments.
FIG. 2B provides a photographic image of an article formed from acrylonitrile butadiene styrene by freeform additive manufacturing using a yield-stress support bath, according to some embodiments.
FIG. 2C provides a photographic image of an article formed from acrylonitrile butadiene styrene by freeform additive manufacturing using a yield-stress support bath, according to some embodiments.
FIG. 2D provides a photographic image of an article formed from acrylonitrile butadiene styrene by freeform additive manufacturing using a yield-stress support bath, according to some embodiments.
FIG. 2E provides a photographic image of an article formed from acrylonitrile butadiene styrene by freeform additive manufacturing using a yield-stress support bath, according to some embodiments.
FIG. 2F provides a photographic image of an article formed from an acrylic by freeform additive manufacturing using a yield-stress support bath, according to some embodiments.
FIG. 2G provides a photographic image of an article formed from an acrylic by freeform additive manufacturing using a yield-stress support bath, according to some embodiments.
FIG. 2H provides a photographic image of an article formed from polyurethane by freeform additive manufacturing using a yield-stress support bath, according to some embodiments.
FIG. 2I provides a photographic image of an article formed from polyurethane by freeform additive manufacturing using a yield-stress support bath, according to some embodiments.
FIG. 2J provides a photographic image of an article formed from polyacrylonitrile by freeform additive manufacturing using a yield-stress support bath, according to some embodiments.
FIG. 2K provides a photographic image of an article formed from polyacrylonitrile by freeform additive manufacturing using a yield-stress support bath, according to some embodiments.
FIG. 2L provides an graphic representation of a gear vase design for an additive manufacturing process, according to some embodiments.
FIG. 2M provides an graphic representation of a spiral cone design for an additive manufacturing process, according to some embodiments.
FIG. 2N provides an graphic representation of a T-junction design for an additive manufacturing process, according to some embodiments.

Printed structures using a variety of ink and support material formulations are shown in FIGS. 2A-2K along with the designs in FIGS. 2L-2N according to which the printed structures were printed. In general, the printed parts closely match the original design, regardless of the build material. For each material, ink concentration, support bath material formulation, and print parameters were optimized for best results; material details are discussed in the following sections. Wall thickness was on the order of about 300 μm, which was approximately equivalent to the extrusion tip width.

As illustrated, printed ABS structures demonstrate a variety of feature types: thin walls, flat overhangs, solid regions, and detailed surfaces. The gear vase and tubular structures illustrate the ability to print functional containers and conduits with arbitrary features otherwise unachievable by additive manufacturing such as the perfectly horizontal upper section of the T-junction. Attempting to form structures having a similar form factor using FDM would require a more complex printing process and would result in a formed article that is mechanically and structurally deficient. For instance, to print structures having a similar form factor using FDM would require the part and/or the entire printing platform be rotated in space during printing, resulting in a more complex printing process, requiring more complex parts since analogous features may not have an 'easy' orientation for 3D printing according to FDM. In contrast, using a yield-stress support bath according to any of the embodiments described herein, the print quality is nearly independent of orientation of the printed article and results in more accurate and precise printing of the article relative to the input model. Also, the thin walls of the tube which might deform during FDM were substantially unaffected by gravity during support bath-enabled printing, which may be due to the fact that strain is prevented, for the intermediate article and/or the finished article, by the yield-stress support material surrounding the printed intermediate article and/or finished article.

Because the coagulation of the printed material often requires diffusion between the yield-stress support bath and the printed material, thin walled parts or shells such as the tubular conduit and hollow vase structures are sometimes most convenient to print using the described processes according to some embodiments. However, in some embodiments, such as illustrated in FIG. 2B, bulk solid parts are also achievable using the described approaches. Blocks having dimensions of, for instance, 8×8×6 mm were printed (see, e.g., FIG. 2B) as a test case to determine parameters and verify that they can be fabricated, however other bulk and solid parts and structures were also successfully printed and many others were contemplated and are covered by the present disclosure. The coagulation process for material within the bulk part is complicated by the presence of the coagulated shell around the exterior. This prevents shrinkage of the overall shape as solvent slowly diffuses out of the interior leaving behind coagulated solid build material. In some cases, the volumetric shrinkage is accommodated by the formation of void space within the bulk part, as discussed in more detail in the following section. A more controllable option is to reduce the print speed so that the interior layers almost completely coagulate as the next layer is being printed. This ensures that the entire volume of the printed part experiences similar coagulation conditions and minimizes the occurrence of voids in printed parts.

In general, similar shape fidelity is achieved for all materials and structures. Differences in performance for specific build materials are discussed in relation to ink formulations and support material formulations in later sections.

Morphology and Mechanical Property Results

Figure 4:
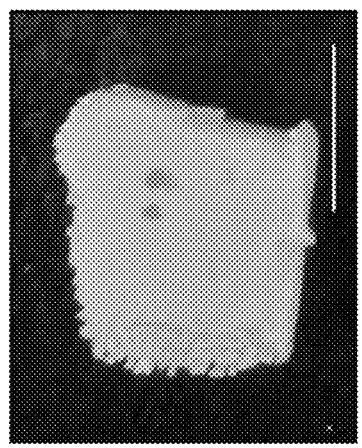
FIG. 4 provides a photographic image of an ABS part printed in a yield-stress support bath, according to an embodiment.

The porosity of solid printed ABS parts was evaluated by optical microscopy, as shown in FIG. 4. With optimized printing conditions and designs, nominally solid ABS parts have a porosity of about 15% by volume; voids are typically in the form of spherical cavities and are attributed to pockets of fluid which form as the polymer coagulates and shrinks after printing.

Figure 5:
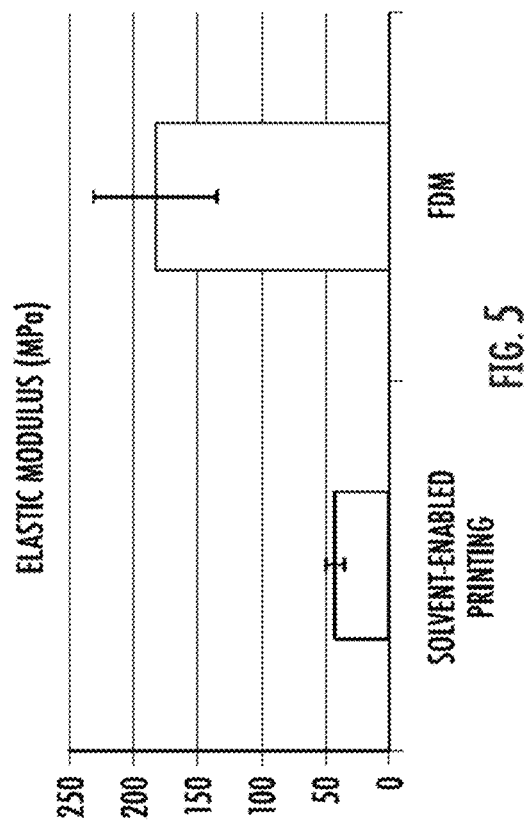
FIG. 5 is a graphical representation of the tensile modulus of an article, printed according to a freeform additive manufacturing method described herein, compared to an article printed using conventional FDM and the intrinsic properties of ABS.

As illustrated in FIG. 5, printed ABS tensile test specimens are compared with conventional FDM tensile test specimens; ABS was selected since the build material is identical for both processes. Although the materials are identical, the mechanical behavior of printed specimens shows some variations and printed specimens are less stiff than the FDM parts and reported intrinsic properties of ABS.

Material Selection Results

A variety of factors affect the material coagulation process. Wet spinning studies of PAN have shown that the bath composition significantly affects the diffusion of both DMSO and water; this holds true to a greater or lesser degree with any polymer/solvent/non-solvent system. It can be explained in terms of two competing effects: the formation of a solid surface layer on the extruded polymer solution which serves as a barrier to further solvent exchange, and the solvent gradient existing between the polymer solution and the coagulation bath, which provides the driving force for coagulation. In solvent-rich coagulation baths, the surface barrier against solvent exchange is very thin so solvent exchange proceeds rapidly. As the water content increases, the solvent exchange slows since the barrier layer becomes thicker. However, the driving force for solvent exchange is also increasing and eventually dominates the process. It is noteworthy that the different coagulation conditions are also associated with different fiber morphologies: water-rich coagulation baths result in fibers with strictly circular cross sections (due to the rapid coagulation at the spinneret surface) but often with large irregular internal voids, while solvent-rich coagulation conditions generally result in fully dense bean-shaped cross-sections since the outer shell is soft enough to collapse as solvent exchange progresses. In this work, a fully dense internal morphology along with slow coagulation to permit fusion of adjacent filaments is desirable, so the focus is on solvent-rich conditions. The specific effects of variation in ink and/or solvent formulation are discussed in the following sections.

After printing is complete, the part must be completely solidified for recovery from the yield-stress support bath and subsequent utilization. In some ways, this is analogous to the polymer fiber wet spinning process in which a polymer solution is extruded through a spinneret into a solvent-rich coagulation bath to form the initial fiber, then passes through solvent-poor stages to complete solidification. However, in the printing process disclosed herein, the yield-stress support material might not be replaced without damaging the printed liquid (or partially coagulated) part. Instead, the entire support bath is immersed in a large volume of non-solvent so that the overall solvent concentration is significantly reduced. In some embodiments, over time, the large reservoir of non-solvent draws solvent out of the yield-stress support bath to approach a homogeneous solvent-poor composition throughout the yield-stress support bath volume. In turn, this solvent-poor environment draws residual solvent out of the printed liquid or partially coagulated polymer structure, leaving a solid part.

For fiber spinning processes, the solvent composition is typically 20-70% (with the remainder being a non-solvent). However, since the goal in this work is slow solidification rather than near-instantaneous stabilization of rapidly forming fibers, a higher solvent content is expected to produce better results. In polymer processing, most interactions are governed by entropy. The compositional entropy enabled by solvent/non-solvent mixing may be far greater than the loss due to polymer solidification, so a polymer solution solidifies on contact with a bulk solvent/non-solvent mixture compatible with the solvent but incompatible with the polymer. Without wishing to be bound by any particular theory, the solvent may diffuse into the solution, increasing the overall entropy. However, without wishing to be bound by any particular theory, because the non-solvent properties dominate in the resulting mixture of solvent and non-solvent, the polymer may no longer be soluble and may form a solid mass.

In some embodiments, criteria for selecting a solvent/non-solvent pair for processing a polymer using the proposed printing process may include one or more of at least: the solvent/non-solvent pair should be miscible, the solvent should produce polymer solutions with suitable properties (viscosity, stability), and the polymer should be essentially insoluble in the non-solvent. To demonstrate this process, DMSO was used as the solvent and water as the non-solvent. This combination is miscible in all proportions, and DMSO is an effective solvent for a wide array of polymers, enabling testing of a variety of build materials with the same support bath material system. DMSO is also convenient and desirable at least because it is relatively non-volatile, minimizing solvent loss to the atmosphere and concomitant alteration of the solvent/non-solvent ratio in the yield-stress support material. In addition, commercially available rheology modifiers are available to convert the free flowing DMSO/water mixtures to yield-stress materials. However, the process may be implemented with any combination of solvent and non-solvent for which the rheology can be appropriately adjusted.

Ink Formulation Results

The ink formulation affects the fabrication process in various ways. There are at least two stages to the process: deposition and coagulation. During deposition, the viscosity and viscoelasticity of the ink affect shape fidelity, achievable speed, and overall flow behavior. During coagulation, the ink formulation affects coagulation speed, size and morphology of filaments/parts, and final properties of the printed part. Print parameters and ink formulations are designed to minimize variations due to the deposition process Ink formulations should balance printability with printed part quality. In some embodiments, a lower polymer concentration in the ink formulation may make flow control easier, to a point; however, filaments formed by low-concentration inks may be inconsistent and shrink significantly relative to the printed design. Shrinkage is particularly troublesome since it may cause separation between adjacent filaments during the coagulation process as well as distort the overall shape. In extreme cases, the material will simply form disconnected wisps of solid material instead of a continuous filament. On the other hand, highly viscous polymer-rich ink formulations are more difficult to print accurately due to a tendency to ooze and failure to start/stop cleanly.

In general, structures printed with higher ink concentrations are more robust; this makes sense since more polymer is deposited in concentrated inks than in dilute inks. However, the ranges for 'dilute' and 'concentrated' inks varies from polymer to polymer; high molecular weight PAN (150 kDa) is printable in the 7-15% w/v range, while ABS, acrylic, and soft PU are printable in the 10-30% range. These differences are a result of specific polymer properties as well as their interactions with solvent and non-solvent during the printing and post-processing steps. Although the specified ranges are printable, the outcome may vary significantly. For instance, as illustrated in FIG. 6A, a build material comprising 10% PU produces recognizable parts but there are often gaps due to the small amount of deposited polymer and structures collapse under their own weight in air. On the other hand, as illustrated in FIG. 6B, a build material comprising 30% PU produces relatively softer, more robust, more continuous parts which can support their own weight in air. Similarly, as illustrated in FIGS. 6C and 6D, both 20% and 30% ABS ink formulations may produce parts that are or appear solid; however, the 20% build material in FIG. 6C results in weaker structures since less material is deposited, while the 35% ABS build material in FIG. 6D produces distinctly thicker walls, and is much more difficult to control. As such, the conveniently printable range of concentrations for ABS using these printing conditions, e.g., up to 30% and 35% ink, may be more useful or only useful for a limited range of part morphologies where dispensing start/stop behavior is not critical. The macroscopic features of printed PAN parts are less sensitive to polymer concentration in the range used herein, but its coagulation behavior presents other challenges.

Without wishing to be bound by any particular theory, one of the significant factors affecting ink coagulation is the identity of the polymer. For a given polymer, the coagulation behavior is relatively insensitive to the actual polymer content. However, for instance, lower concentration formulations may take slightly longer to coagulate completely and may develop gaps due to shrinkage, while the printed material after coagulation looks and feels similar regardless of the ink concentration.

As illustrated in FIGS. 6C and 6D, printed ABS may form more rigid solid parts than PU, as illustrated in FIGS. 6A and 6B, regardless of the ink concentration. Observations indicate that solvent diffusion during coagulation was nearly unidirectional: printed parts have uniform hard surfaces and closely match the designed dimensions. This indicates that water was not incorporated into the printed build material during coagulation and that ABS coagulation is a relatively simple process of DMSO diffusing to the surrounding support bath, not a bidirectional process with water diffusing into the printed material as well as DMSO diffusing out. Similar results are observed for acrylic and PU build materials: the printed parts are rigid solids which retain their shape in air and show no evidence of support bath material surface inclusions or trapped solvent. The behavior of PAN, however, is quite different and is discussed in more detail in relation to PU.

Although PU is less compatible with water than PAN, the kinetics of the solvent diffusion process differ between polymers. PU coagulates relatively slowly over a wide range of support bath solvent compositions (about 5%-25% water), producing similar structures regardless of the exact support bath composition. Without wishing to be bound by any particular theory, this may be attributed to the relatively weak interactions between PU and water, which may lead to almost unidirectional diffusion of solvent out of the printed material (rather than a complex solvent exchange process where water diffuses into the printed material as DMSO diffuses out). Without wishing to be bound by any particular theory, this diffusion process may be primarily controlled by polymer content, although the composition of the yield-stress support bath may determine the strength of the driving force and there is therefore also an observable difference in coagulation speed depending on the yield-stress support material formulation.

In contrast, PAN often requires more extensive process optimization. In some embodiments, PAN-based ink formulations may be sensitive to the water content of the yield-stress support material. For instance, in some embodiments, for support bath materials above 15% water, the ink coagulates almost immediately after extrusion (or as a trailing blob attached to the extrusion tip), making it very difficult to precisely control the process. Indeed, printing PAN structures in Laponite XLG-based support bath material (25% water) often requires extensive manual intervention to clear away initial dragging artifacts but may be more successful when the extrusion is continuous. In some embodiments, printed PAN parts are often incomplete or distorted due to these or other issues. As such, PAN printing in Laponite XLG may be limited to printing simple parts which can be printed without interruption. On the other hand, in more DMSO-rich Carbopol based support bath material, coagulation may be much slower, which may facilitate the deposition process but often causes a deterioration in part quality. Because coagulation is retarded in DMSO-rich Carbopol support bath formulations, diffusion of the printed polymer into the surrounding support bath material often becomes significant and the properties of the printed parts are noticeably different. As such, instead of hard, rigid features, PAN parts printed in Carbopol as described for PU are flexible and slippery due to incorporation of Carbopol and water in the coagulating polymer. In some embodiments, this traps solvent and changes the mechanical properties of the printed part. Although the solvent can be removed by drying, the weakened diffuse polymer network is unable to retain the designed shape and generally collapses. In addition, even if the printed part retains its shape upon drying, it remains prone to absorbing water again, making its properties unpredictable. Thus, the simple aqueous post treatment suitable for recovering useable PU parts may be inadequate for PAN.

Several strategies to simultaneously improve PAN printability and structural integrity were tested. Replacing water with ethanol in both the yield-stress support material formulation and the post-treatment step had little effect on the outcome, although ethanol was expected to be more effective at coagulating PAN based at least in part on reported interaction parameters. Chilling the entire system during post-treatment also had little effect, despite the expectation that it would retard polymer diffusion more significantly than solvent exchange. Heat treatment within the yield-stress support bath after printing (e.g., by heating for 1 hr at 85° C.) caused deterioration in part quality compared to ambient post-processing: the printed parts were intact but unable to support their own weight in air.

Support Material Formulation Results

To enable solvent-based ink formulations and the formation of fluid 3D parts, compatible support bath materials were developed. Support-bath enabled fabrication for a variety of processes may rely on fluid precursors, although work to date has focused on cross-linkable material systems where the entire volume of the ink material is transformed into a solid or gel part. In some embodiments, solvent-based ink formulations were developed which coagulate to form solid printed parts. Support bath materials may comprise a solvent (or mixture of solvents) and a rheology modifier. In some embodiments, the solvent chosen may dictate many of the chemical interactions with printed build material while the rheology modifier is, ideally, an inert additive which transforms the fluid solvent into a yield-stress material. In some embodiments, the polymer build material is pre-polymerized, meaning the stimulus to cause coagulation is simply removal of the solvent. Thus, the yield-stress support bath must be formulated to promote slow coagulation of the printed part by diffusion of solvent into the yield-stress support material. As has been demonstrated for other build materials where the coagulation stimulus is distributed throughout the yield-stress support bath, speedy coagulation often results in nozzle clogging, while insufficient coagulation speed results in poorly-defined parts. That is, where ink and support bath materials are miscible, diffusion at the interface causes slow deterioration of print quality. For consistent print quality, the yield-stress support bath according to some embodiments promotes at least some degree of coagulation so that part quality is independent of printing time. In some embodiments, coagulation is promoted by using a combination of a good solvent (herein dimethyl sulfoxide (DMSO), the same solvent as the ink formulation) and a poor solvent or non-solvent (water) to control the coagulation process in conjunction with a commercially available rheology modifier which is compatible with these mixed solvents. Since the kinetics of the coagulation process are specific to ink formulations and, to a lesser degree, to part designs, a support bath with tunable solvent content is desirable for solution-based polymer printing.

In some embodiments, Carbopol can be used as a rheology modifier to control support bath rheology. In some embodiments, Carbopol was shown to be particularly useful for the DMSO-water solvent-non-solvent system since it works equally effectively to thicken any combination of these two liquids. This is clearly visible in the rheological properties of the formulations at each end of the solvent spectrum (pure DMSO and pure water), which can be similar at least in some instances. Carbopol consists of cross-linked poly(acrylic acid) particles which may swell in water and other solvents to form microgels. When these microgels occupy the entire volume of the solvent, they are jammed together resulting in yield-stress behavior. While Laponite XLG can also modify the rheology of some formulations, in some embodiments Laponite XLG may require a significant amount of hydrogen bonding with the solvent to be effective and is therefore limited to DMSO-water formulations containing at least 25% water. Laponite XLG is discussed herein as an alternative rheological additive to demonstrate that the solvent-enabled support bath printing approach is not limited to microgel-based rheological additives such as Carbopol. Furthermore, other rheological additives are also possible for providing suitable mechanical properties for supporting printing using solvent-based ink formulations.

Without wishing to be bound by any particular theory, the solvent composition of the yield-stress support bath may determine the strength of the driving force for solvent diffusion and therefore the speed at which printed parts coagulate, while the concentration of the rheology modifier (Carbopol, Laponite, etc.) may determine the overall rheology of the yield-stress support material and influences print quality. In some embodiments, a higher concentration of rheological additive may result in a higher yield stress for a support bath formulation. In some embodiments, the preparation protocol may be critical for Carbopol; for instance, the solvents may be pre-mixed or combined with the dry Carbopol at the same time. Pre-mixing DMSO with Carbopol, then adding water later, resulted in more rapid coagulation of the printed material and therefore reduced print quality. Without wishing to be bound by any particular theory, this may be attributed to a higher water fraction in the interstitial solvent between microgels since the microgels initially swelled in pure DMSO. In other words, delaying the addition of water to the formulation may have the same effect as increasing the overall water concentration, that is, coagulation of the printed ink material may be faster.

Although the solvent composition, according to some embodiments, may be critical for achieving sufficient printing performance, it sometimes or often has little effect on the rheology and/or other properties of the yield-stress support material. For instance, a concentration of 1.5% Carbopol 940 in 100% water is quite similar to a concentration of 1.5% Carbopol 940 in 100% DMSO. This may be a valuable feature of the type of multi-component support bath material system described herein. Without wishing to be bound by any particular theory, as intermediate solvent formulations show, the rheology may be independent of or nearly independent of the solvent composition. As such, in some embodiments, the essential rheological behavior to effectively support the printing process can be adjusted independently of the solvent composition, which controls coagulation and vice-versa.

In an example in which the building material comprises ABS, a concentration of about 90% DMSO is found to be sufficient for printing structures. This solvent content induces reasonably rapid hardening of the deposited filaments and is rich enough in solvent that there is a delay between deposition and full solidification. In other words, there is sufficient solvent in the ABS/DMSO solution such that it takes a sufficiently long time for the DMSO to be removed and for the ABS to solidify, forming the finished article. This behavior rapidly stabilizes the printed structure but avoids issues with nozzle clogging due to rapid coagulation. With lower solvent content (e.g., less than or equal to about 85%, as illustrated in FIGS. 7A and 7B), dragging is observed as the filament coagulates too rapidly and sticks to the extrusion tip. On the other hand, building materials comprising ABS in 95% DMSO, for instance, results in a coagulation process that is slow and inconsistent, resulting in intermittent dragging and smearing of printed parts. The resulting poor shape fidelity is illustrated by the spiral cone parts shown in FIGS. 7C and 7D.

In some embodiments, a building material can comprise PU ink. Without wishing to be bound by any particular theory, for PU/solvent building materials, the main determinant of structure quality may be the rheology of the yield-stress support material. As such, in some embodiments, processes using PU ink may be relatively insensitive to the solvent composition since it inherently coagulates more slowly than PAN or ABS. In a support bath material with a high yield stress, the flow of the yield-stress support material behind the extrusion tip is slower than in a support bath material with a lower yield stress (more prone to fluid-like behavior). Thus, with a low-viscosity ink in a high yield-stress support material, backflow behind the extrusion tip can be problematic. As such, this may result in a loss of shape fidelity due to uncontrolled upward deformation of filaments in a Z direction (e.g., depth direction) during printing. Without wishing to be bound by any particular theory, a support bath material with low yield stress may improve print quality. In some embodiments, it may also be more economical and may facilitate the solvent exchange process for final coagulation of the printed material. As illustrated, results may be reasonably similar for support bath material formulations with up to about 90% DMSO, with up to about 95%, and with up to about 100% DMSO content in the yield-stress support material. However, in some embodiments, the quality of the printed parts may deteriorate because the driving force for coagulation is so weak that polymer diffusion becomes significant. In some embodiments, a disadvantage of low yield-stress support material is a propensity to distortion if the yield-stress support bath is jarred during and/or after printing. For instance, jostling can cause bulk motion of the yield-stress support material within the container, distorting all or part of the printed material. Depending on the specific printer configuration, this consideration may limit the speed of the print head and affect the overall fabrication time.

While PAN parts are successfully fabricated using this methodology, PAN-based ink may be more sensitive to the yield-stress support material composition. When printed in relatively water-rich support bath material, PAN ink coagulates so quickly that printing is complicated by dragging of the coagulated material. On the other hand, in a more solvent-rich support bath material, as the coagulation process slows, other processes, such as diffusion of the polymer itself into the surrounding support bath material, may become slower. Thus, in solvent-rich support bath materials, shape fidelity may suffer and PAN parts may become soft due to high porosity and solvent content. In some embodiments, when water is omitted from the yield-stress support material, defined shapes may not be recovered due to extensive diffusion of the printed material within the yield-stress support bath. At the opposite extreme, when a fully aqueous support bath material is utilized, the printed ink may coagulate quickly, e.g., immediately upon contact with the yield-stress support material and may adhere to or clog the tip instead of being deposited in the designed sequence of filaments and layers.

Post-Treatment Results

An important feature of the support-bath enabled printing methodology is the ability to form structures from fluid build materials. However, this also presents a problem: fluid structures only retain their shape so long as they are undisturbed in the yield-stress support bath. To be of practical use, it is essential that the fluid part be converted to a solid which can be removed from the yield-stress support bath. As noted above, in solvent-enabled printing, the stimulus for this transition is the loss of solvent as it diffuses from the printed material to the surrounding support bath material. Without wishing to be bound by any particular theory, in a solvent-rich support bath formulation, the driving force for this diffusion may be weak and coagulation may therefore be slow. Thus, a post-treatment step may be introduced to increase the driving force for coagulation by increasing the non-solvent content in the material surrounding the printed part. In other words, after printing, the yield-stress support bath can be immersed in a larger reservoir filled with water or an aqueous salt solution (or any other suitable solution operable to diffuse the solvent) to reduce the overall solvent content and drive coagulation of the printed parts.

For ABS, PAN, and acrylic parts, among others, the post-printing immersion in water is helpful or essential to achieve solid parts in a reasonable time frame. Although ABS and PAN inks slowly coagulate in 90% DMSO, they remain relatively soft at this high solvent content. In some embodiments, acrylic ink visibly changes from transparent brown to opaque beige during coagulation. However, no visual evidence of coagulation is observed before immersion in the post-treatment bath, suggesting that the post-treatment is essential for diffusion of the solvent and coagulation of the polymeric material.

Figure 8:
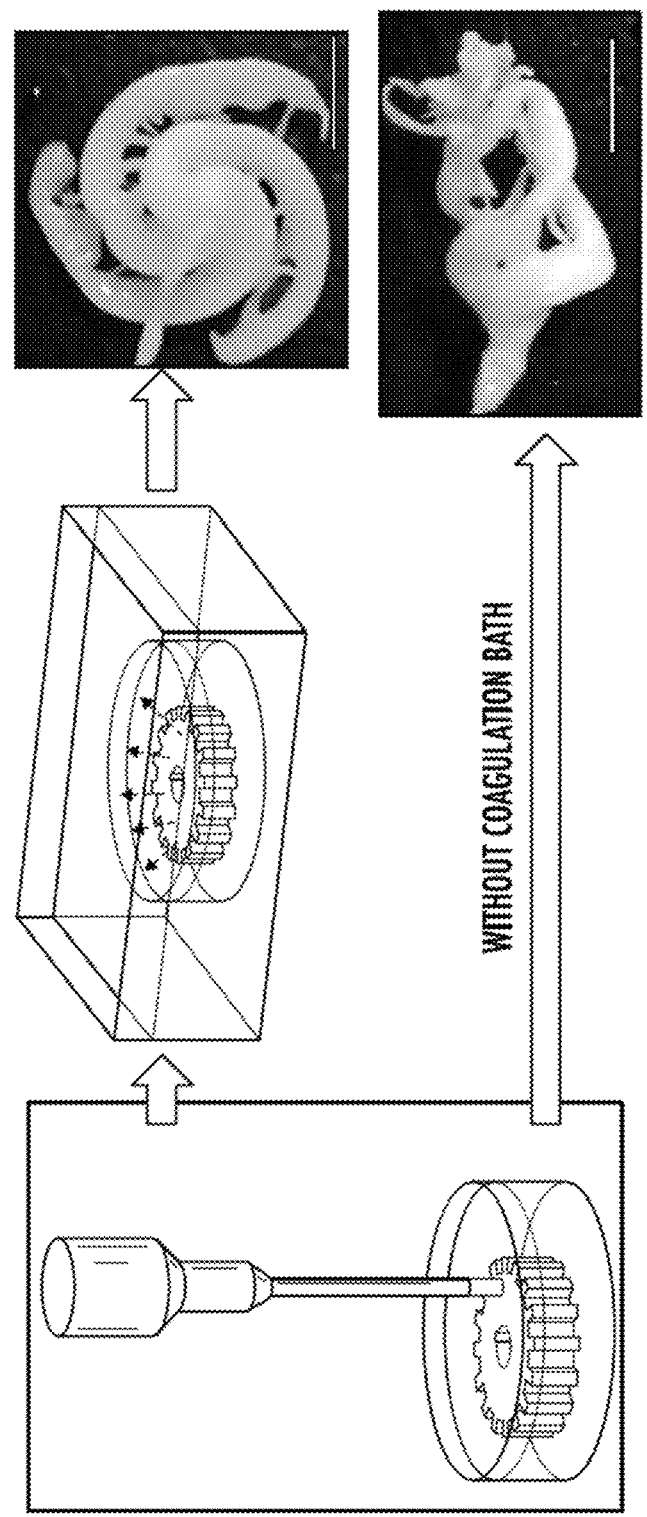
FIG. 8 illustrates a process for injecting a printing mixture into and/or not into a yield-stress support bath in such a way to make comparison of undesirable deformation of the finished article after 3D printing and provides photographic images of deformed finished articles that result from said process, according to an embodiment.

For PU, a visible change is also evident as the transparent ink forms a white solid. In support bath materials with up to about 90% DMSO, visible progress towards coagulation is apparent within 30 min without post-treatment. However, printed PU structures approach equilibrium with the yield-stress support bath at a relatively high residual solvent level since the yield-stress support bath is solvent-rich even though it initiates the coagulation process for the ink. Therefore, after printing, a more aggressive treatment to remove residual solvent can be carried out to make the printed part solid rather than simply a very plastic polymer paste, which is prone to deformation if removed from the yield-stress support bath as shown in FIG. 8. In some embodiments, the yield-stress support material water content may be insufficient to completely solidify the printed material and further treatment may be helpful or essential for PU coagulation. In some embodiments, simply immersing the yield-stress support bath containing the printed part in additional water may be sufficient to partially or completely coagulate the printed structures into robust freestanding parts.

CONCLUSIONS

Disclosed herein are various embodiments of a method for polymer 3D printing that enables freeform fabrication of polymeric structures under ambient conditions without the use of printed support structures. In some embodiments, the build material is first dissolved in a suitable solvent for extrusion printing. In some embodiments, the polymer solution is then directly printed in and supported by a yield-stress support bath to form filaments, layers, and eventually an entire 3D part in the yield-stress support material. In some embodiments, the printed part may remain a liquid, such as a viscous liquid, or an only partially coagulated material. According to some embodiments, after printing, the yield-stress support bath container may be immersed in a post-treatment coagulation solution to partially or fully solidify the printed polymer material, and the printed part may then be removed from the yield-stress support material and post-treatment bath. Provided herein are solvent-rich support bath materials that enable facile 3D fabrication of a range of polymeric build materials at room temperature. Printing performance can be adjusted by varying the ink and support bath formulations to achieve desired resolution, printing speed, and surface quality. Post-treatment is an essentially hands-off procedure for this approach. The advantages of the disclosed methods, apparatuses and materials of manufacture, some of which are outlined throughout this disclosure, provide a compelling and effective solution to many of the problems in the 3D printing industry, some of which are outlined earlier in the disclosure.

Described hereinabove are methods and associated apparatuses for forming a yield-stress support material, preparing a yield-stress support bath comprising the yield-stress support material, preparing a build material solution for 3D printing into the yield-stress support material, forming an intermediate article within the yield-stress support material, and exposing the intermediate article to a stimulus (e.g., a chemical operable to remove the solvent from the build material solution) to solidify or partially solidify the intermediate article to form a finished article.

In some embodiments, a method was provided for 3D printing of a finished article, the method comprising: dispensing a mixture of a polymeric material and a solvent into a yield-stress support bath; allowing the mixture to only partially coagulate, forming an intermediate article; and exposing the intermediate article to a post-treatment coagulation solution to fully solidify the intermediate part, forming the finished article. In some embodiments, the method can further comprise dissolving the polymeric material in the solvent to form the mixture of the polymeric material and the solvent. In some embodiments, the polymeric material can be a first polymeric material and the solvent is a first solvent. In some embodiments, the method can further comprise: mixing a rheological additive material with a second solvent, a mixture of solvents, and/or a solvent/non-solvent mixture, any of which can include the first solvent; and allowing the mixture of the rheological additive material with a second solvent, a mixture of solvents, and/or a solvent/non-solvent mixture to become at least partially solid-like, forming the yield-stress support bath. In some embodiments, at least one of the dispensing, the allowing, or the exposing can be carried out by an apparatus comprising a reservoir configured to contain a supply of the mixture of the polymeric material and the solvent, a nozzle, and a computing device. In some embodiments, the nozzle may be configured and dimensioned to reduce or eliminate nozzle movement-induced liquefaction of the yield-stress support bath. In some embodiments, the apparatus can be configured to communicate the mixture of the polymeric material and the solvent from the reservoir, through the nozzle, and into the yield-stress support bath. In some embodiments, the computing device can be configured to move the nozzle during the dispensing such that a first portion of the supply of the mixture of the polymeric material and the solvent can be dispensed in a first portion of the yield-stress support bath and a second portion of the supply of the mixture of the polymeric material and the solvent can be dispensed in a second portion of the yield-stress support bath. In some embodiments, the 3D printing can be carried out at about room temperature. In some embodiments, the intermediate article and finished article can be formed free of printed support structures. Said another way, whereas other 3D printing techniques often require a support structure to be concurrently printed with the finished article to help support the article during printing, the methods and associated apparatuses described herein may not use any support structures or may use less support structures than other methods.

According to another embodiment, as described hereinabove, a method is provided for 3D printing of a finished article, the method comprising: dissolving a polymeric material in a solvent to form a mixture of the polymeric material and the solvent; dispensing the mixture of the polymeric material and the solvent into a yield-stress support bath; allowing the mixture to only partially coagulate, forming an intermediate article; and exposing the intermediate article to a post-treatment coagulation solution or alternative solidification stimuli (such as radiation and/or temperature change) to fully solidify the intermediate part, forming the finished article. In some embodiments, the polymeric material may be a first polymeric material and the solvent may be a first solvent. In some embodiments, the method can further comprise: mixing a rheological additive material with a second solvent, a mixture of solvents, and/or a solvent/non-solvent mixture, any of which can include the first solvent; and allowing the mixture of the rheological additive material with a second solvent, a mixture of solvents, and/or a solvent/non-solvent mixture to become at least partially solid-like, forming the yield-stress support bath. In some embodiments, the dispensing may be carried out by an apparatus comprising a reservoir configured to contain a supply of the mixture of the polymeric material and the solvent, a nozzle, and a computing device, the apparatus configured to carry out at least one of the dispensing, the allowing, and the exposing. In some embodiments, the apparatus can be configured to communicate the mixture of the polymeric material and the solvent from the reservoir, through the nozzle, and into the yield-stress support bath. In some embodiments, the computing device may be configured to guide the movement the nozzle during the dispensing such that a first portion of the supply of the mixture of the polymeric material and the solvent can be dispensed in a first portion of the yield-stress support bath and a second portion of the supply of the mixture of the polymeric material and the solvent can be dispensed in a second portion of the yield-stress support bath. In some embodiments, the nozzle may be a printing nozzle. In some embodiments, the 3D printing is carried out at about room temperature. In some embodiments, the intermediate article and finished article may be formed free of printed support structures.

According to still other embodiments, a method is provided, as described hereinabove, for forming a yield-stress support bath for three-dimensional printing of a finished article, the method comprising: mixing a rheological additive material with a solvent, a mixture of solvents, and/or a solvent/non-solvent mixture to form a support mixture; and allowing the mixture of the rheological additive, solvent, mixture of solvents, and/or solvent/nonsolvent mixture to become at least partially solid. In some embodiments, the solvent may be a first solvent. In some embodiments, the method may further comprise: mixing a polymeric material and a second solvent to form a print mixture; disposing said print mixture into a bath of the support mixture; allowing the printing mixture to only partially coagulate, forming an intermediate article; and exposing the intermediate article to a post treatment coagulation solution to fully solidify the intermediate part, forming the finished article. In some embodiments, 3D printing may be carried out at about room temperature, and/or the intermediate article and finished article may be formed free of printed support structures. In some embodiments, the polymeric material may be a first polymeric material and the solvent may be a first solvent. In some embodiments, the method can further comprise: mixing a rheological additive material with a second solvent, a mixture of solvents, and/or a solvent/non-solvent mixture, any of which can include the first solvent; and allowing the mixture of the rheological additive material with a second solvent, a mixture of solvents, and/or a solvent/non-solvent mixture to become at least partially solid-like, forming the yield-stress support bath. In some embodiments, at least one of the dispensing, the allowing, and the exposing can be carried out by an apparatus comprising a reservoir configured to contain a supply of the mixture of the polymeric material and the solvent, a nozzle, and/or a computing device. In some embodiments, the apparatus may be configured to communicate the mixture of the polymeric material and the solvent from the reservoir, through the nozzle, and into the yield-stress support bath. In some embodiments, the computing device may be configured to move the nozzle during the dispensing such that a first portion of the supply of the mixture of the polymeric material and the solvent can be dispensed in a first portion of the yield-stress support bath and a second portion of the supply of the mixture of the polymeric material and the solvent can be dispensed in a second portion of the yield-stress support bath.

In some embodiments, one or more of the operations, steps, elements, or processes described herein may be modified or further amplified as described below. Moreover, in some embodiments, additional optional operations may also be included. It should be appreciated that each of the modifications, optional additions, and/or amplifications described herein may be included with the operations previously described herein, either alone or in combination, with any others from among the features described herein.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular. Further, any reference to dispensing, disposing, depositing, dispersing, conveying, injecting, inserting, communicating, and other such terms of art are not to be construed as limiting the element to any particular means or method or apparatus or system, and is taken to mean conveying the material within the receiving vessel, solution, conduit, or the like by way of any suitable method.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation. Specific equipment and materials described in the examples are for illustration only and not for purposes of limitation. For instance, any and all articles, portions of articles, structures, bulk materials, and/or the like, having any form factor, scale, dimensions, aesthetic attributes, material properties, internal structures, and/or mechanical properties, which are formed according to any of the disclosed methods, approaches, processes, or variations thereof, using any devices, equipment, apparatuses, systems, or variations thereof, using any of the build material, printing mixture, ink, yield-stress support material, or other material compositions described herein or variations thereof, are all contemplated and covered by the present disclosure. None of the examples provided are intended to, nor should they, limit in any way the scope of the present disclosure.

Every document cited or referenced herein, including any cross referenced or related patent or application is hereby incorporated herein by reference in its entirety unless expressly excluded or otherwise limited. The citation of any document and/or the mention of methods or apparatuses as being conventional, typical, usual, or the like is not, and should not be taken as an acknowledgement or any form of suggestion that the reference or mentioned method/apparatus is prior art with respect to any invention disclosed or claimed herein or that it alone, or in any combination with any other reference or references, teaches, suggests or discloses any such invention or forms part of the common general knowledge in any country in the world. Further, to the extent that any meaning or definition of a term in this document conflicts with any meaning or definition of the same term in a document incorporated by reference, the meaning or definition assigned to that term in this document shall govern.

The various portions of the present disclosure, such as the Background, Summary, Brief Description of the Drawings, and Abstract sections, are provided to comply with requirements of the MPEP and are not to be considered an admission of prior art or a suggestion that any portion or part of the disclosure constitutes common general knowledge in any country in the world. The present disclosure is provided as a discussion of the inventor's own work and improvements based on the inventor's own work. See, e.g., *Riverwood Intl Corp. v. R.A. Jones & Co.*, 324 F.3d 1346, 1354 (Fed. Cir. 2003).

The invention claimed is:

1. A method for three-dimensional printing of a finished article, the method comprising:
   dispensing a mixture of a polymeric material and a solvent into a yield-stress support bath;
   allowing the mixture to only partially coagulate, forming an intermediate article; and
   exposing the intermediate article to a post-treatment coagulation solution to fully solidify the intermediate part, forming the finished article.

2. The method of claim 1, further comprising:
   dissolving the polymeric material in the solvent to form the mixture of the polymeric material and the solvent.

3. The method of claim 1, wherein the polymeric material is a first polymeric material and the solvent is a first solvent, the method further comprising:
   mixing a rheological additive material with a second solvent, a mixture of solvents, or a solvent/non-solvent mixture; and
   allowing the mixture of the rheological additive material with the second solvent, the mixture of solvents, or the solvent/non-solvent mixture to become at least partially solid-like, forming the yield-stress support bath.

4. The method of claim 1, wherein at least one of the dispensing, the allowing, or the exposing is carried out by an apparatus comprising one or more of a reservoir configured to contain a supply of the mixture of the polymeric material and the solvent, a nozzle, and a computing device.

5. The method of claim 4, wherein the nozzle is configured and dimensioned to reduce or eliminate nozzle movement-induced liquefaction of the yield-stress support bath.

6. The method of claim 4, wherein the apparatus is configured to communicate the mixture of the polymeric material and the solvent from the reservoir, through the nozzle, and into the yield-stress support bath.

7. The method of claim 6, wherein the computing device is configured to guide the movement of the nozzle during the dispensing such that a first portion of the supply of the mixture of the polymeric material and the solvent can be dispensed in a first portion of the yield-stress support bath and a second portion of the supply of the mixture of the polymeric material and the solvent can be dispensed in a second portion of the yield-stress support bath.

8. The method of claim 1, wherein the intermediate article and finished article are formed free of printed support structures.

9. A method for three-dimensional printing of a finished article, the method comprising:
   dissolving a polymeric material in a solvent to form a mixture of the polymeric material and the solvent;
   dispensing the mixture of the polymeric material and the solvent into a yield-stress support bath;
   allowing the mixture to only partially solidify, forming an intermediate article; and
   exposing the intermediate article to a post-treatment coagulation solution or alternative solidification stimuli to fully solidify the intermediate part, forming the finished article.

10. The method of claim 9, wherein the polymeric material is a first polymeric material and the solvent is a first solvent, the method further comprising:
    mixing a rheological additive material with a second solvent, a mixture of solvents, and/or a solvent/non-solvent mixture, any of which can include the first solvent; and
    allowing the mixture of the rheological additive material with a second solvent, a mixture of solvents, and/or a solvent/non-solvent mixture to become at least partially solid-like, forming the yield-stress support bath.

11. The method of claim 10, wherein the dispensing is carried out by an apparatus comprising a reservoir configured to contain a supply of the mixture of the polymeric material and the solvent, a nozzle, and a computing device, the apparatus configured to carry out at least one of the dispensing, the allowing, and the exposing.

12. The method of claim 11, wherein the apparatus is configured to communicate the mixture of the polymeric material and the solvent from the reservoir, through the nozzle, and into the yield-stress support bath.

13. The method of claim 12, wherein the computing device is configured to guide the movement of the nozzle during the dispensing such that a first portion of the supply of the mixture of the polymeric material and the solvent can be dispensed in a first portion of the yield-stress support bath and a second portion of the supply of the mixture of the polymeric material and the solvent can be dispensed in a second portion of the yield-stress support bath.

14. The method of claim 10, wherein the three-dimensional printing is carried out at about room temperature.

15. The method of claim 10, wherein the intermediate article and finished article are formed free of printed support structures.

16. A method for forming a yield-stress support bath for three-dimensional printing of a finished article, the method comprising:
  mixing a rheological additive material with a solvent, a mixture of solvents, and/or a solvent/non-solvent mixture to form a support mixture;
  allowing the mixture of the rheological additive, solvent, mixture of solvents, and/or solvent/nonsolvent mixture to become at least partially solid, forming the yield-stress support bath.

17. The method of claim 16, wherein the solvent is a first solvent, the method further comprising:
  mixing a polymeric material and a second solvent to form a print mixture;
  disposing said print mixture into a bath of the support mixture;
  allowing the printing mixture to only partially coagulate, forming an intermediate article; and
  exposing the intermediate article to a post treatment coagulation solution to fully solidify the intermediate part, forming the finished article,
  wherein the three-dimensional printing is carried out at about room temperature, and
  wherein the intermediate article and finished article are formed free of printed support structures.

18. The method of claim 17, wherein at least one of the disposing, the allowing, and the exposing is carried out by an apparatus comprising a reservoir configured to contain a supply of the mixture of the polymeric material and the solvent, a nozzle, and a computing device,
  wherein the apparatus is configured to communicate the mixture of the polymeric material and the solvent from the reservoir, through the nozzle, and into the yield-stress support bath.

19. The method of claim 18, wherein the computing device is configured to guide the movement of the nozzle during the dispensing such that a first portion of the supply of the mixture of the polymeric material and the solvent can be dispensed in a first portion of the yield-stress support bath and a second portion of the supply of the mixture of the polymeric material and the solvent can be dispensed in a second portion of the yield-stress support bath.

20. The method of claim 18, wherein the nozzle is configured and dimensioned to reduce or eliminate nozzle movement-induced liquefaction of the yield-stress support bath.

* * * * *